(12) United States Patent  
Ishida et al.

(10) Patent No.: US 11,706,865 B2  
(45) Date of Patent: Jul. 18, 2023

(54) LIGHTING CONTROL DEVICE, LIGHTING CONTROL SYSTEM, AND LIGHTING CONTROL METHOD

(71) Applicant: Panasonic Intellectual Property Management Co., Ltd., Osaka (JP)

(72) Inventors: Yoshihiko Ishida, Kanagawa (JP); Yoshinori Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 261 days.

(21) Appl. No.: 17/237,695

(22) Filed: Apr. 22, 2021

(65) Prior Publication Data

US 2021/0243873 A1 Aug. 5, 2021

Related U.S. Application Data

(63) Continuation of application No. PCT/JP2019/041145, filed on Oct. 18, 2019.

(30) Foreign Application Priority Data

Oct. 25, 2018 (JP) .................................. 2018-201173

(51) Int. Cl.
*H05B 47/19* (2020.01)
*G06T 7/50* (2017.01)
(Continued)

(52) U.S. Cl.
CPC ......... *H05B 47/19* (2020.01); *G06F 3/04883* (2013.01); *G06T 7/50* (2017.01);
(Continued)

(58) Field of Classification Search
CPC ........ H05B 45/10; H05B 45/20; H05B 47/10; H05B 47/11; H05B 47/19; H05B 47/155;
(Continued)

(56) References Cited

U.S. PATENT DOCUMENTS

2004/0246366 A1* 12/2004 Hakamata ................ H04N 5/30
348/370
2014/0268700 A1 9/2014 Mumma et al.
(Continued)

FOREIGN PATENT DOCUMENTS

| JP | 8-180702 | 7/1996 |
| JP | 2001-67910 | 3/2001 |

(Continued)

OTHER PUBLICATIONS

International Search Report dated Dec. 17, 2019 in corresponding International Application No. PCT/JP2019/041145.

*Primary Examiner* — Haissa Philogene
(74) *Attorney, Agent, or Firm* — Wenderoth, Lind & Ponack, L.L.P.

(57) ABSTRACT

A lighting control device controls illumination of a lighting device using a plurality of light sources. The lighting control device includes a processing unit that executes processing related to control on the illumination. The processing unit acquires direction designation information for designating at least one illumination direction to which the lighting device illuminates, acquires light source information indicating a plurality of light source irradiation directions that are irradiation directions of the plurality of light sources, and based on (i) at least one designated illumination direction that is the at least one illumination direction designated by the direction designation information and (ii) the plurality of light source irradiation directions, causes part of the plurality of light sources to illuminate.

31 Claims, 22 Drawing Sheets

(51) Int. Cl.
  *G06T 7/70* (2017.01)
  *H05B 47/155* (2020.01)
  *G06F 3/04883* (2022.01)
  *H04N 23/698* (2023.01)

(52) U.S. Cl.
  CPC ............ *G06T 7/70* (2017.01); *H04N 23/698* (2023.01); *H05B 47/155* (2020.01); *G06F 2203/04808* (2013.01)

(58) Field of Classification Search
  CPC ........... H05B 47/175; G06T 7/70; G06T 7/73; G06T 7/50; G06T 15/50; G06T 16/51; G06T 15/506; G06F 3/04883; G06F 3/04845; G06F 3/0488; G06F 2203/04808; F21S 8/00; F21V 23/0492; F21L 4/02; H04N 23/56; H04N 23/62; H04N 23/698
  See application file for complete search history.

(56) References Cited

U.S. PATENT DOCUMENTS

2017/0223807 A1\* 8/2017 Recker ...................... H02J 9/02
2022/0015211 A1\* 1/2022 Knoop ..................... B60Q 1/30

FOREIGN PATENT DOCUMENTS

| | | |
|---|---|---|
| JP | 2011-34934 | 2/2011 |
| JP | 2014-235907 | 12/2014 |
| JP | 2018-147751 | 9/2018 |

\* cited by examiner

FIG. 8

| LED NUMBER | θ | φ | |
|---|---|---|---|
| No.1 | 5 DEGREES | 0 DEGREES | |
| No.2 | 5 DEGREES | 15 DEGREES | ← TL1 |
| : | : | : | |
| No.n | 175 DEGREES | 345 DEGREES | |

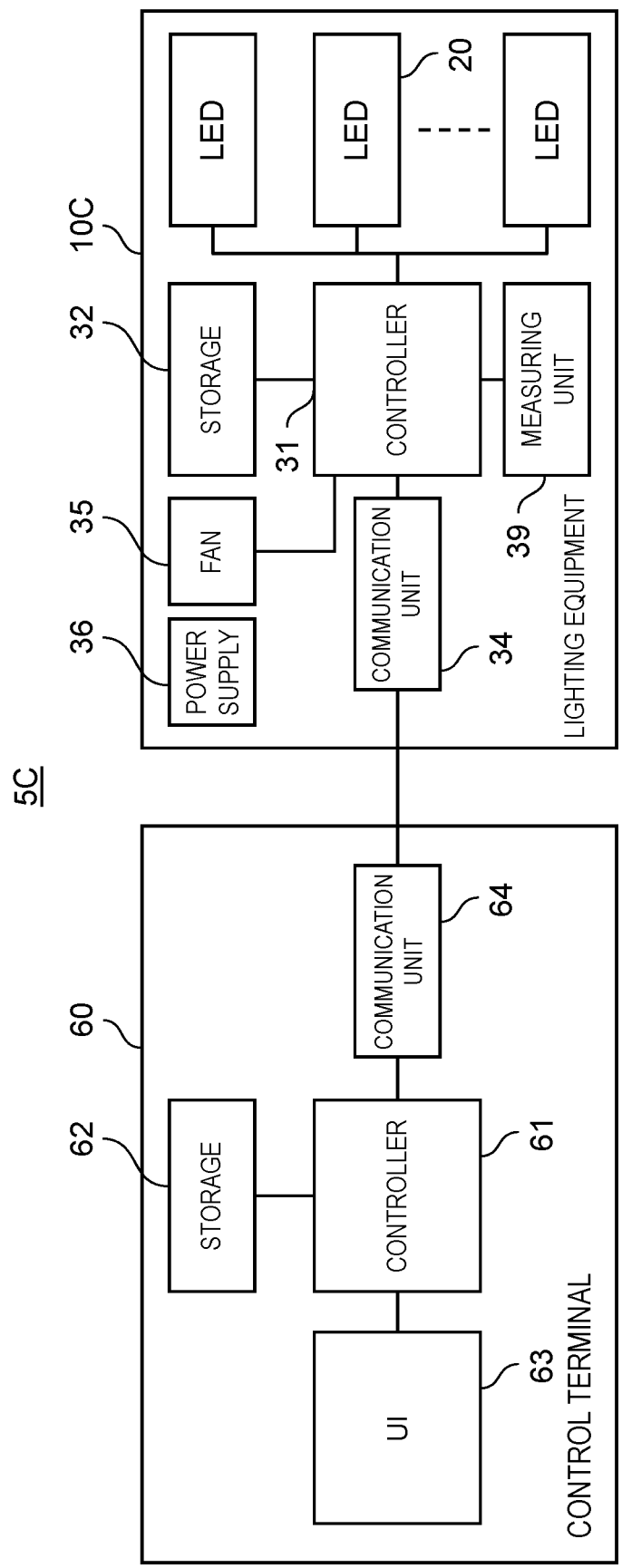

LIGHTING CONTROL DEVICE, LIGHTING CONTROL SYSTEM, AND LIGHTING CONTROL METHOD

BACKGROUND

1. Technical Field

The present disclosure relates to a lighting control device, a lighting control system, and a lighting control method for controlling lighting.

2. Description of the Related Art

Conventionally, a spotlight has been known that performs lighting by being driven in a pan direction and a tilt direction (see Patent Literature (PTL) 1). The spotlight includes a spotlight main body containing an illuminating lamp, a pan drive block that causes a pan operation of the spotlight main body, and a tilt drive block that causes a tilt operation, and a drive control unit that implements the pan operation and the tilt actuation.

PTL 1 is Unexamined Japanese Patent Publication No. H08-180702.

SUMMARY

It takes time to move the spotlight of PTL 1 in the pan direction and the tilt direction. Thus, it may take time before the spotlight can perform lighting in a predetermined direction desired by a user. In addition, the drive unit for pan/tilt required renders the configuration complicated, meaning that mechanical failure is likely to occur, and thus regular maintenance is required.

The present disclosure has been made in view of the above, and provides a lighting control device, a lighting control system, and a lighting control method with which lighting can be swiftly performed in a direction desired by the user, of all the directions, with a simple configuration.

One aspect of the present disclosure is a lighting control device that controls illumination of a lighting device using a plurality of light sources. The lighting control device includes a processing unit that executes processing related to control on the illumination. The processing unit acquires direction designation information for designating at least one illumination direction to which the lighting device illuminates, acquires light source information indicating a plurality of light source irradiation directions that are irradiation directions of the plurality of light sources, and based on (i) at least one designated illumination direction that is the at least one illumination direction designated by the direction designation information and (ii) the plurality of light source irradiation directions, causes part of the plurality of light sources to illuminate.

One aspect of the present disclosure is a lighting control system comprising: a lighting device using a plurality of light sources; and a lighting control device that controls illumination of the lighting device. The lighting control device acquires direction designation information for designating an illumination direction to which the lighting device illuminates, acquires light source information indicating a plurality of light source irradiation directions that are irradiation directions of the plurality of light sources, and based on (i) a designated illumination direction that is the illumination direction designated by the direction designation information and (ii) the plurality of light source irradiation directions, causes part of the plurality of light sources to illuminate.

One aspect of the present disclosure is a lighting control method that controls illumination by a lighting device using a plurality of light sources. The lighting control method includes: acquiring direction designation information for designating an illumination direction to which the lighting device illuminates; acquiring light source information indicating a plurality of light source irradiation directions that are irradiation directions of the plurality of light sources; and based on (i) a designated illumination direction that is the illumination direction designated by the direction designation information and (ii) the plurality of light source irradiation directions, causing part of the plurality of light sources to illuminate.

According to the present disclosure, lighting can be swiftly performed in a direction desired by the user, of all the directions, with a simple configuration.

BRIEF DESCRIPTION OF DRAWINGS

FIG. 8 is a diagram illustrating contents registered in an LED irradiation direction table.

FIG. 22 is a diagram illustrating a hardware configuration of a spotlight system according to a fourth exemplary embodiment.

DETAILED DESCRIPTION

Hereinafter, exemplary embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art. Note that the attached drawings and the following description are provided for those skilled in the art to fully understand the present disclosure, and are not intended to limit the subject matter as described in the appended claims.

First Exemplary Embodiment

Figure 1:
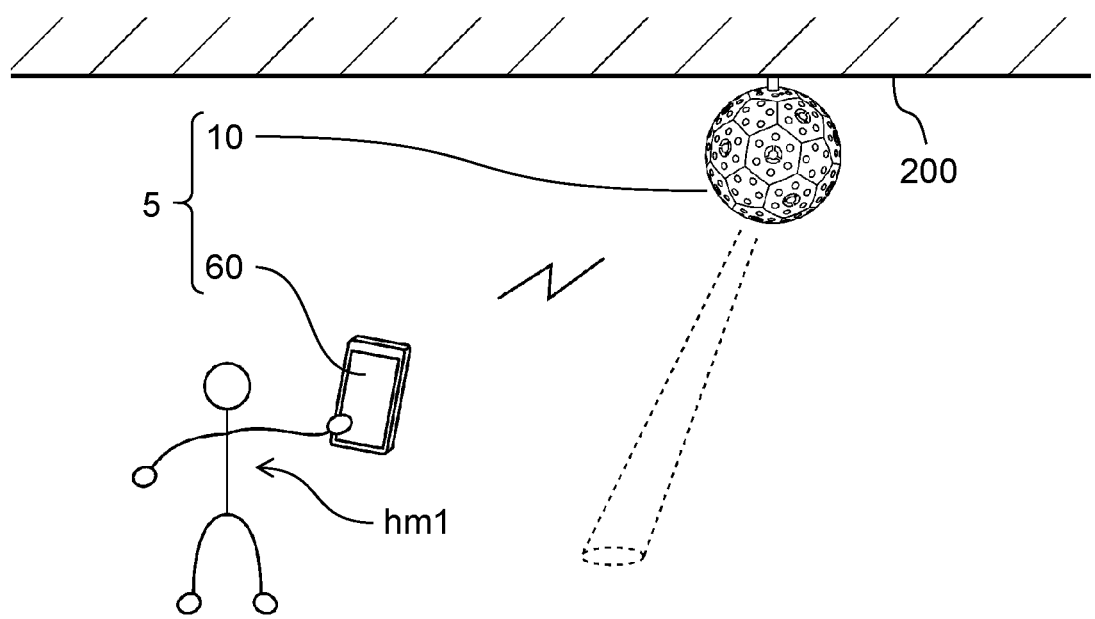
FIG. 1 is a diagram illustrating an example of an overview of a spotlight system according to a first exemplary embodiment.

FIG. 1 is a diagram illustrating an example of an overview of spotlight system 5 according to a first exemplary embodiment. Spotlight system 5 has a configuration including lighting equipment 10 and control terminal 60. Lighting equipment 10 is installed on ceiling 200 in a room. Control terminal 60 is a mobile terminal such as a smartphone that can be operated by user hm1. Control terminal 60 is not limited to the mobile terminal, and may be a dedicated remote controller. Lighting equipment 10 has spherical exterior 10z (see FIG. 2). On the inner side of exterior 10z, a plurality of light emitting diodes (LEDs) 20 (see FIG. 3) capable of emitting light to the outside of exterior 10z are arranged. Lighting equipment 10 can emit spotlight in any direction, with the plurality of LEDs 20 selectively turned ON. User hm1 operates control terminal 60 and designates the lighting direction when lighting equipment 10 functions as a spotlight. Control terminal 60 transmits information including the designated lighting direction (light source irradiation information) to lighting equipment 10. Lighting equipment 10 selects and turns ON LED 20 that can illuminate in the designated lighting direction. This illumining may include simply emission of light, as well as emitting light in various light emission patterns (lighting patterns) such as blinking.

First Example of Lighting Equipment

Figure 2:
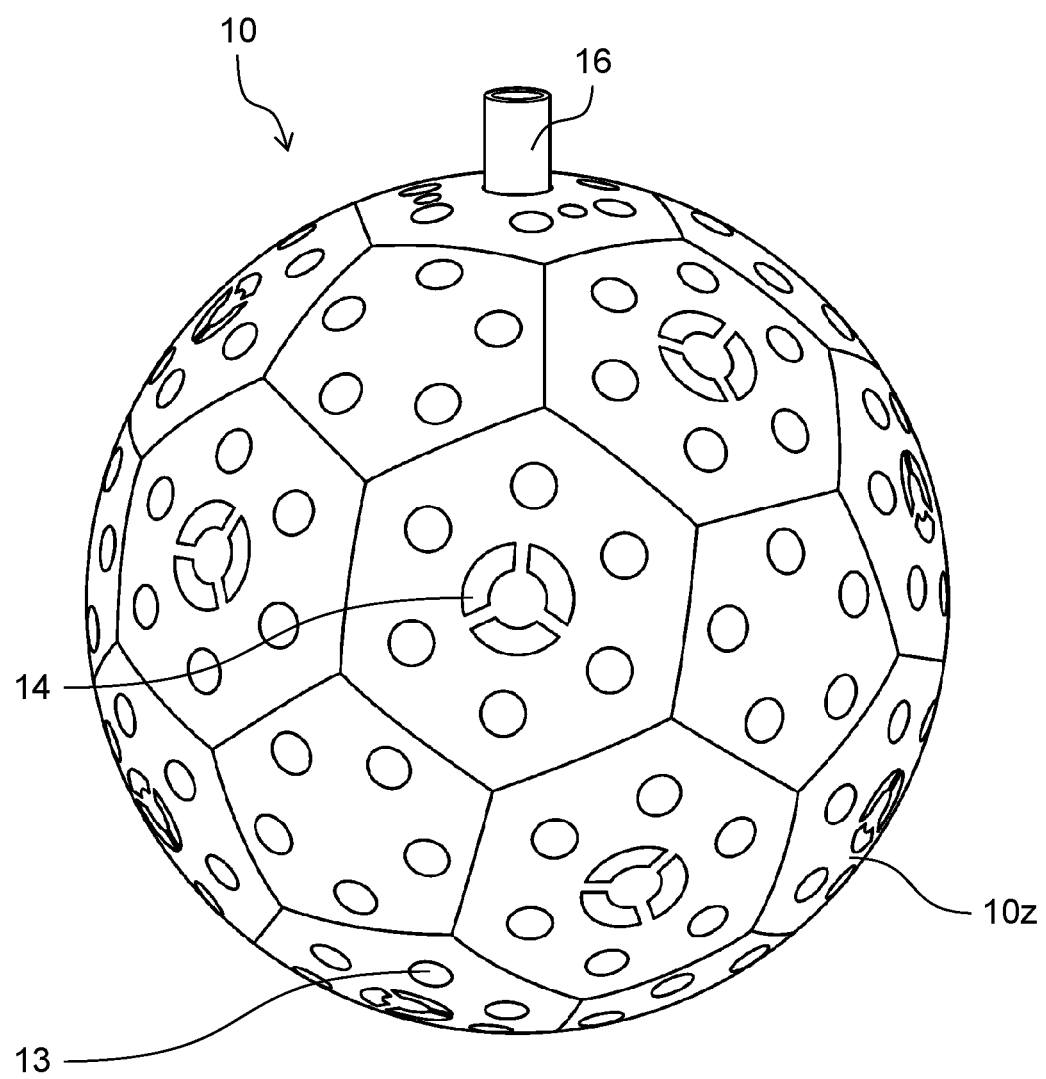
FIG. 2 is a diagram illustrating an appearance of a lighting equipment of a first example.

FIG. 2 is a diagram illustrating the appearance of lighting equipment 10 of the first example. Lighting equipment 10 has, for example, exterior 10z formed to be spherical. A plurality of translucent members 13 that transmit light from the inside of exterior 10z are fitted to the surface of exterior 10z. Translucent member 13 is formed of a translucent material such as resin or glass. Translucent member 13 may be formed into a lens capable of diffusing light from the inside of exterior 10z. The plurality of translucent members 13 are arranged in proximity to respective apices of a regular pentagon and of a regular hexagon, for example. The plurality of translucent members 13 are respectively arranged with optical axes matching irradiation directions of LEDs 20 arranged on the inner side of exterior 10z. With this configuration, illumination light emitted from LED 20 on the inner side of exterior 10z is efficiently emitted to the outside of exterior 10z through translucent member 13.

Ventilation hole 14 is formed at the center of a regular hexagon formed by six translucent members 13.

Attachment member 16 of a tubular shape is provided at a top portion of exterior 10z. In attachment member 16, a wire for fixing lighting equipment 10 to ceiling 200, and a power cable for supplying power from the commercial power supply to power supply 36 (see FIG. 6) are disposed.

Figure 3:
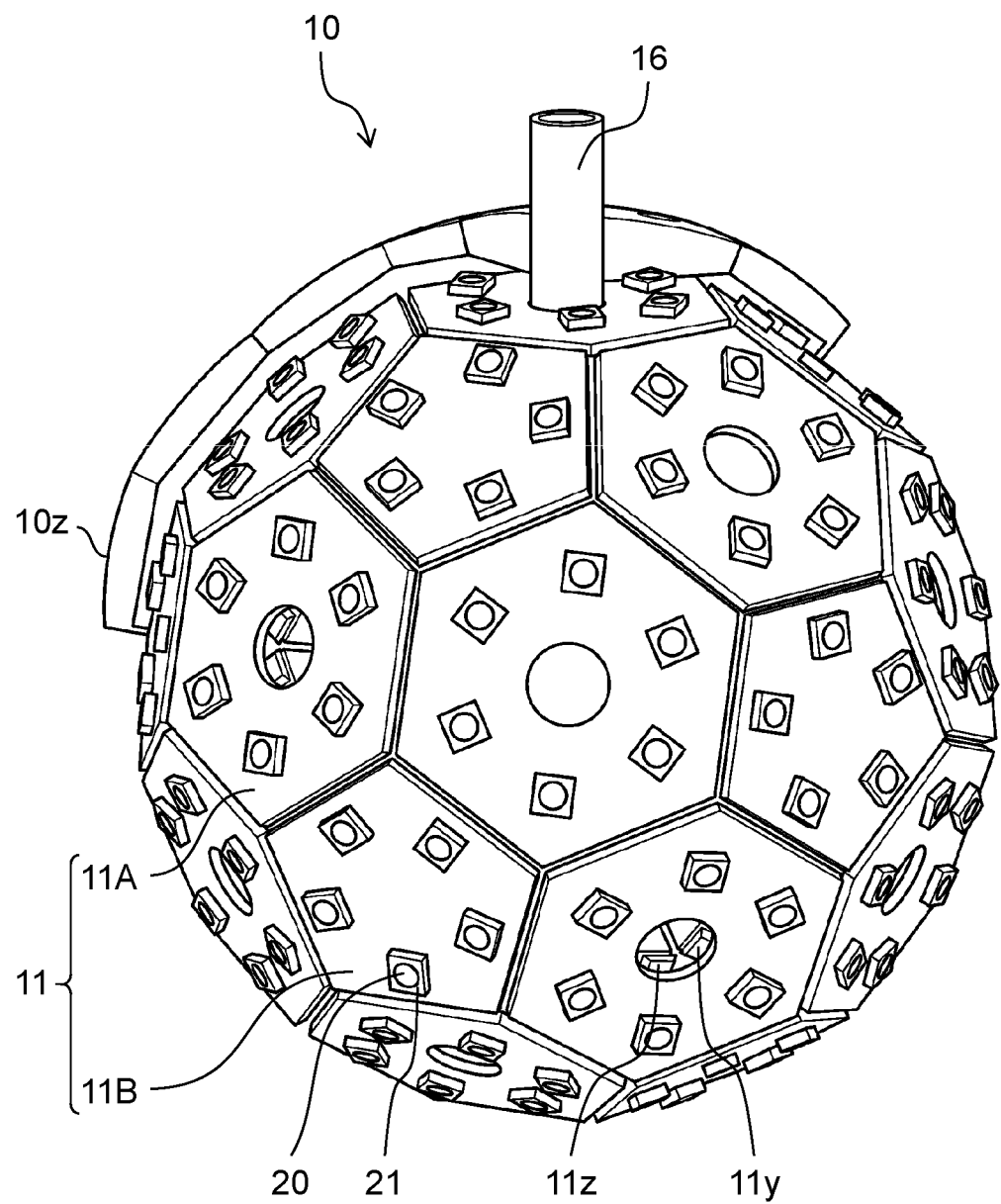
FIG. 3 is a diagram illustrating an internal configuration of the lighting equipment with a part of an exterior removed.

FIG. 3 is a diagram illustrating an internal configuration of lighting equipment 10 with a part of exterior 10z removed. A plurality of substrates 11 forming a polyhedron are arranged on the inner side of exterior 10z. A polyhedron is, for example, a truncated icosahedron as a combination of 20 regular hexagonal surfaces and 12 regular pentagonal surfaces. A surface of substrate (hereinafter, referred to as a regular hexagonal substrate) 11A has six LEDs 20 and six driving circuits 21 arranged at respective corners of the regular hexagon. Six driving circuits 21 drive six respective LEDs 20. A surface of substrate (hereinafter, referred to as a regular pentagonal substrate) 11B has five LEDs 20 and five driving circuits 21 arranged at respective corners of the regular pentagon. Five driving circuits 21 drive five respective LEDs 20. A number of LEDs arranged on each substrate is not limited to this.

Further, regular hexagonal substrate 11A may be formed of, for example, a glass epoxy substrate whose surface is colored in red. Further, regular pentagonal substrate 11B may be formed of, for example, a glass epoxy substrate whose surface is colored in blue. This results in an easily recognizable arrangement of regular hexagonal substrates 11A and regular pentagonal substrates 11B.

At the centers of regular hexagonal substrate 11A and regular pentagonal substrate 11B, hole portions 11z are formed into which male screws 11y are inserted to respectively fix regular hexagonal substrate 11A and pentagonal substrate 11B to a supporting member (not illustrated).

Second Example of Lighting Equipment

Figure 4:
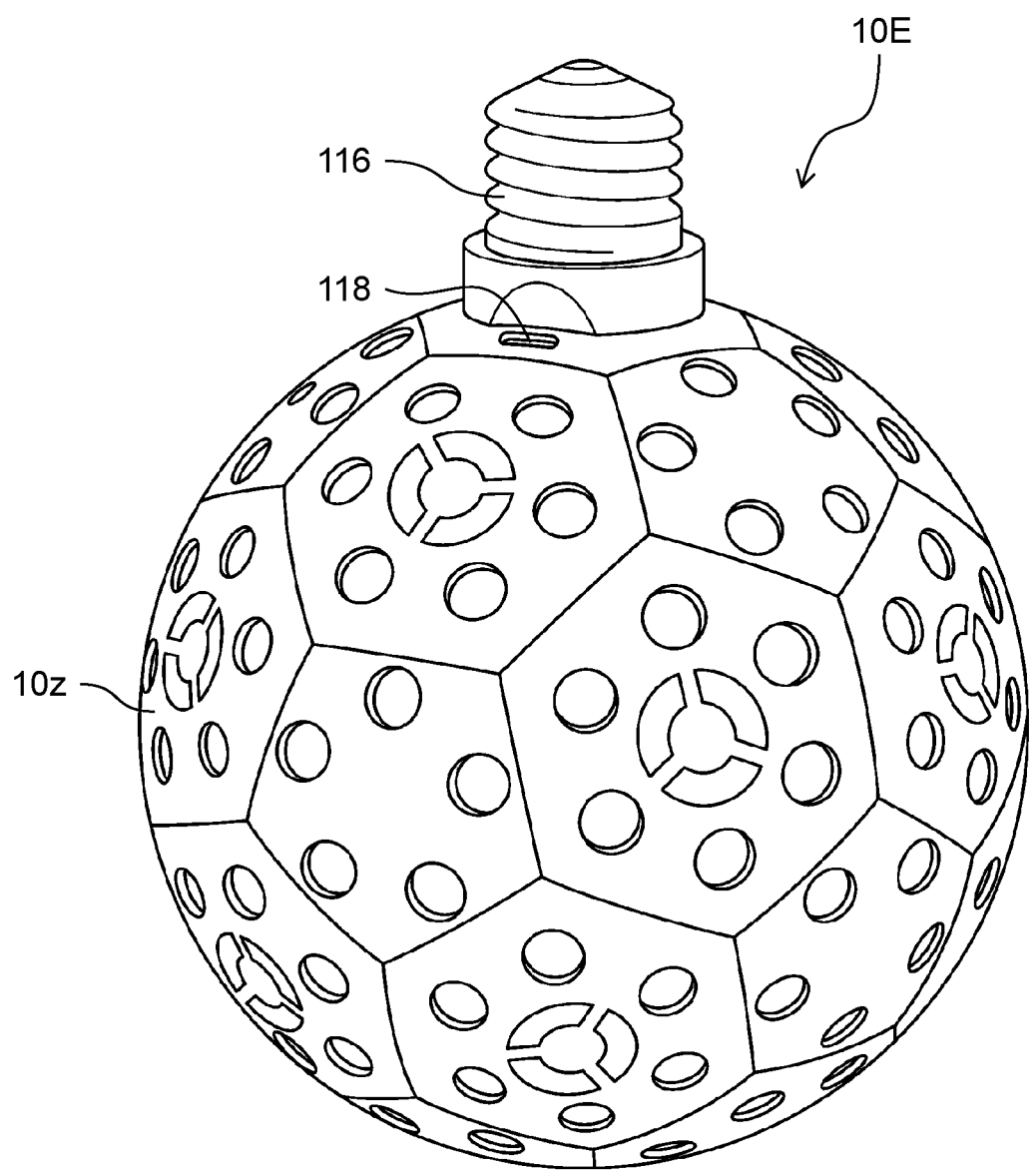
FIG. 4 is a diagram illustrating an appearance of a lighting equipment of a second example.

FIG. 4 is a diagram illustrating the appearance of lighting equipment 10E of a second example. The appearance of lighting equipment 10E is substantially the same as that of lighting equipment 10 of the first example. At the top portion of exterior 10z of lighting equipment 10E, base 116 is provided instead of attachment member 16 of a tubular shape of the first example described above. Base 116 may be, for example, one standardized by JIS C 8280 or IEC 60061. The size of base 116 is, for example, base size E26. Base 116 of lighting equipment 10E is screwed clockwise into a socket attached to the ceiling to support lighting equipment 10E in a suspended state. Base 116 of lighting equipment 10E is released from the socket by being loosened counterclockwise. Further, base 116 is formed of a metal plate and is electrically connected to the socket. The commercial power supply connected to the socket energizes power supply 36 (see FIG. 6) inside lighting equipment 10E in a state where base 116 is connected to the socket. Lighting equipment 10E with base 116 thus provided to exterior 10z is easy to handle. Universal serial bus (USB) port 118 (a USB port for maintenance, for example) is provided in proximity to base 116 of exterior 10z.

Figure 5:
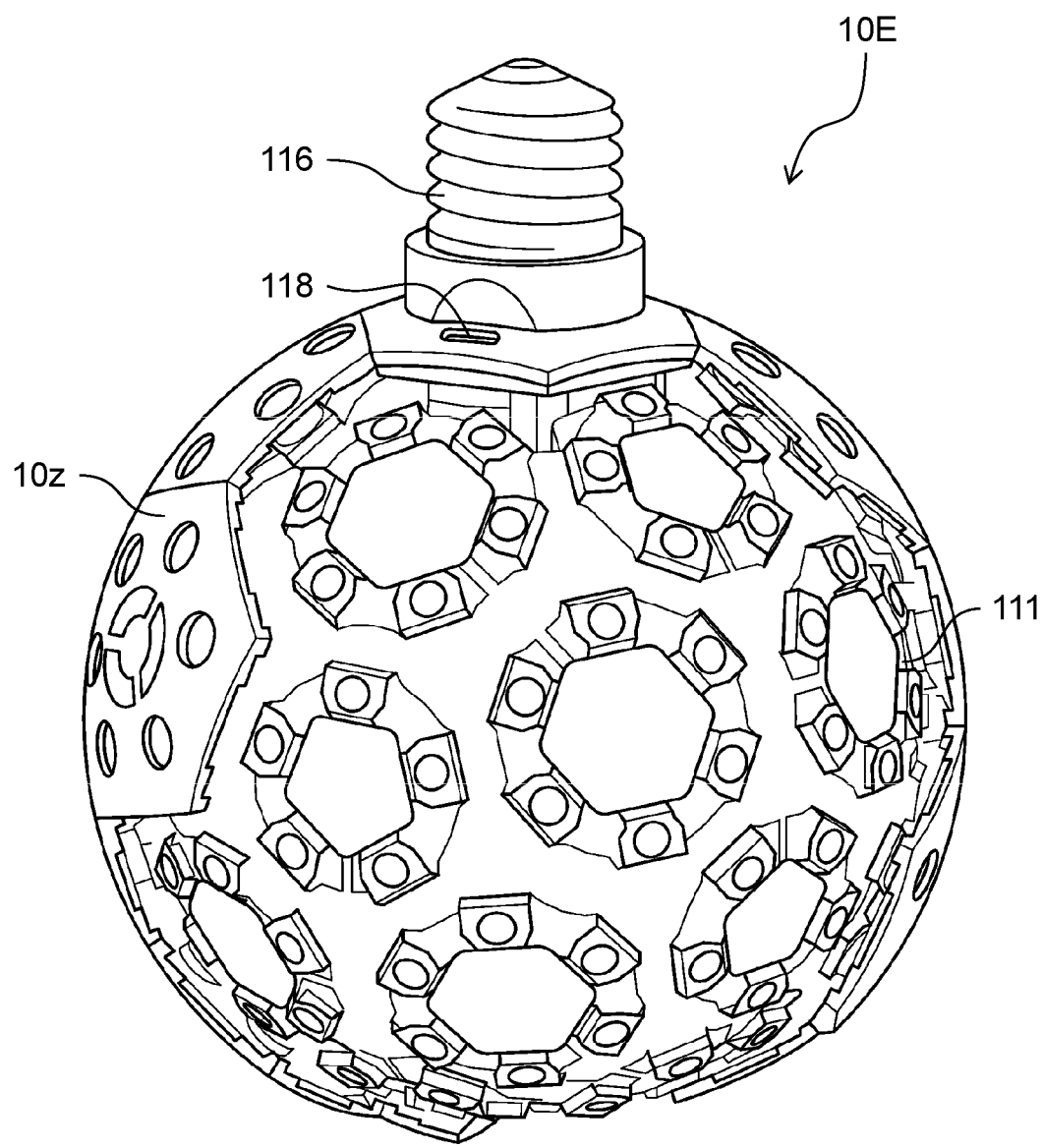
FIG. 5 is a diagram illustrating an internal configuration of the lighting equipment with a part of an exterior removed.

FIG. 5 is a diagram illustrating an internal configuration of lighting equipment 10E of the second example with a part of exterior 10z removed. The plurality of substrates 111, forming the polyhedron and arranged inside exterior 10z of lighting equipment 10E, are flexible substrates. The polyhedron formed by the plurality of substrates 111 may be a truncated icosahedron formed as a combination of regular pentagons and regular hexagons, as in the first example. In the second example, each substrate 111 is curved along a spherical surface inside exterior 10z, whereby the truncated icosahedron formed by the plurality of substrates 111 is of a shape closer to the perfect sphere than that in the first example.

Hereinafter, a description will be given on lighting equipment 10 as the lighting device, but the description similarly applies to lighting equipment 10E.

Figure 6:
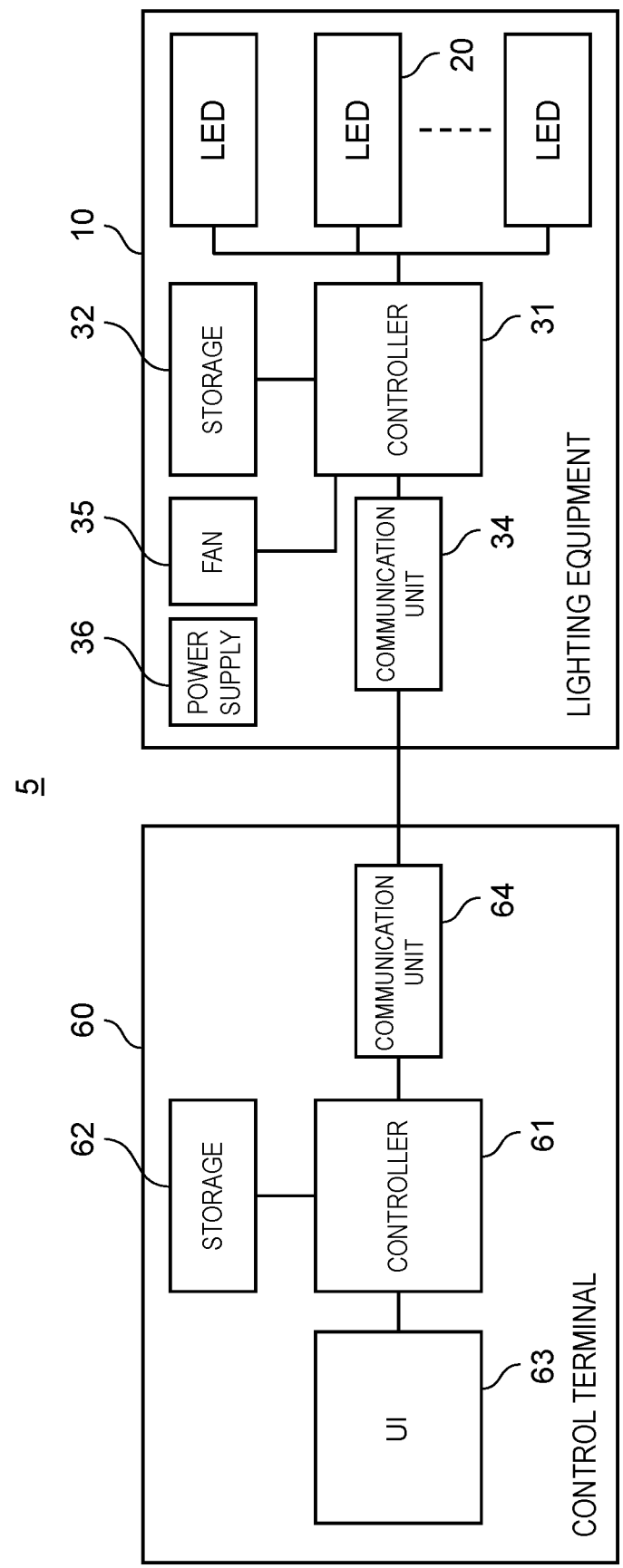
FIG. 6 is a block diagram illustrating a hardware configuration of the spotlight system.

FIG. 6 is a block diagram illustrating a hardware configuration of spotlight system 5. Control terminal 60 has a configuration including controller 61, storage 62, user interface (UI) 63, and communication unit 64.

UI 63 accepts lighting information such as the lighting direction, lighting color, lighting pattern, lighting time, and lighting region designated by user hm1. When the lighting color is a fixed color (for example, white), the designation of the lighting color may be omitted. UI 63 includes, for example, a touch panel having a function as an operation unit and a display. A UI screen suitable for a touch operation by the user is displayed on the touch panel. UI 63 may include the display and the operation unit separately. The display may include a liquid crystal display device, an organic electroluminescence (EL) device, or other display devices. The display displays various types of data and information. The operation unit may include a mouse, keyboard, touch pad, touch panel, microphone, or other input devices. The operation unit accepts input of various types of data and information.

Storage 62 stores LED irradiation direction table TL1 (see FIG. 8) in which LED irradiation directions of LEDs 20 arranged on substrates 11 of lighting equipment 10 are registered. LED irradiation direction table TL1 is not limited to the LED irradiation direction, and may be a light source information table in which information on LEDs (for example, information such as arranged positions of LEDs 20 in lighting equipment 10, orientations of LEDs 20, and color of light that can be emitted by the LEDs may be hereinafter referred to as light source information) is registered. Storage 62 includes a primary storage device (for example, a random access memory (RAM) or a read only memory (ROM)). Storage 62 may include a secondary storage device (for example, hard disk drive (HDD) or solid state drive (SSD)) or a tertiary storage device (for example, an optical disk or SD card). Storage 62 may include other storage devices. Storage 62 stores various types of data, information, programs, and the like.

Controller 61 controls the operation of each part of control terminal 60, and also executes various types of processing. Controller 61 selects LED 20 to be turned ON based on the lighting direction and the lighting color accepted by UI 63, and refers to LED irradiation direction table TL1 stored in storage 62 to acquire the LED number. Controller 61 implements various functions, with a processor executing a program held in storage 62, for example. The processor may include a micro processing unit (MPU), a central processing unit (CPU), a digital signal processor (DSP), a graphical processing unit (GPU), and the like.

Communication unit 64 communicates with lighting equipment 10, and transmits LED irradiation information, including the LED number and the lighting color as light source irradiation information for illumination, to lighting equipment 10. The LED irradiation information may further include information such as a lighting pattern and a lighting time. Further, communication unit 64 is connected to a server over a network, and acquires data such as drawing DR1 (see FIG. 16) of the room stored in the server, for example. A communication scheme used by communication unit 64 may include, for example, a communication scheme such as wide area network (WAN), local area network (LAN), power line communication, infrared communication, short-range wireless communication (for example, Bluetooth (registered trademark) communication), and mobile communication for mobile phones.

Lighting equipment 10 has a configuration including controller 31, storage 32, the plurality of LEDs 20, communication unit 34, fan 35, and power supply 36. Communication unit 34 communicates with control terminal 60 and receives the LED irradiation information from control terminal 60. A communication scheme used by communication unit 34 may include, for example, a communication scheme such as wide area network (WAN), local area network (LAN), power line communication, infrared communication, short-range wireless communication (for example, Bluetooth (registered trademark) communication), and mobile communication for mobile phones, similarly used by control terminal 60.

Controller 31 performs illumination control on LED 20 corresponding to the LED number included in the LED irradiation information. Controller 31 implements various functions, with a processor executing a program held in storage 32, for example, as in control terminal 60. The processor may include a micro processing unit (MPU), a central processing unit (CPU), a digital signal processor (DSP), a graphical processing unit (GPU), and the like.

Storage 32 can be used as a working memory of controller 31. Storage 32 includes a primary storage device (for example, a random access memory (RAM) or a read only memory (ROM)) as in control terminal 60. Storage 32 may include a secondary storage device (for example, a hard disk drive (HDD) or solid state drive (SSD)) or a tertiary storage device (for example, an optical disk or SD card). Storage 32 may include other storage devices. Storage 32 stores various types of data, information, programs, and the like.

The plurality of LEDs 20 are turned ON in response to an illumination instruction from controller 31. Each LED 20 is allocated with an LED number. The irradiation direction of each LED 20 may be orthogonal to the surface of exterior 10z to which each LED 20 is attached. Thus, a direction from the center of lighting equipment 10 to the attached position of each LED 20 is identical to the irradiation direction of LED 20.

Fan 35 is provided on the inner side of exterior 10z. Fan 35 performs air cooling inside exterior 10z, whereby hot air is discharged through ventilation hole 14 formed in exterior 10z. Power supply 36 supplies power to each part of lighting equipment 10, upon being connected to the commercial power supply, for example.

Figure 7A:
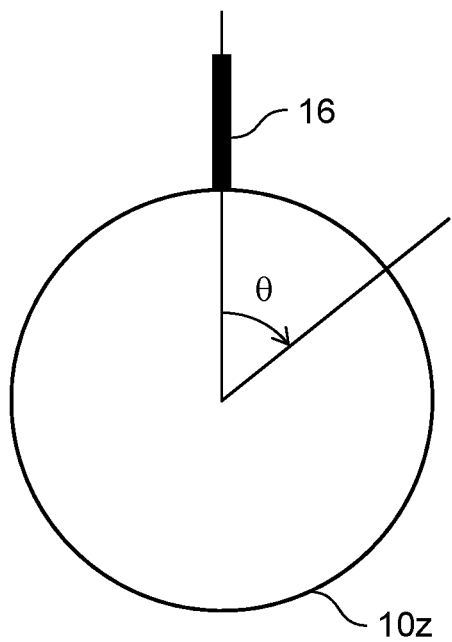
FIG. 7A is a diagram illustrating attached positions of a plurality of light emitting diodes (LEDs) arranged on the exterior of the lighting equipment.
Figure 7B:
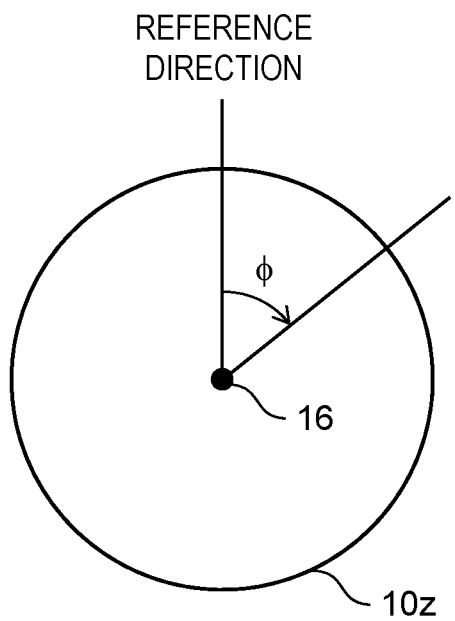
FIG. 7B is a diagram illustrating attached positions of a plurality of LEDs arranged on the exterior of the lighting equipment.

FIGS. 7A and 7B are diagrams illustrating the attached positions of the plurality of LEDs 20 arranged on exterior 10z of lighting equipment 10. When lighting equipment 10 is attached to be suspended from the ceiling, the attached position of each LED 20 is expressed by angle θ (see FIG. 7A) relative to an up and down direction (a direction orthogonal to the ground surface), and angle (I) (see FIG. 7B) relative to a reference direction in a horizontal direction orthogonal to the up and down direction, with the center of lighting equipment 10 serving as the vertex. The reference direction is any direction (for example, the front direction) set to lighting equipment 10 in advance. The user may set the reference direction to a predetermined direction. For example, after the lighting equipment is installed, the reference direction may be set to a direction to a certain target. The reference direction may be fixedly set at the time of shipment of lighting equipment 10. The irradiation direction of each LED 20 is expressed by angles θ, φ indicating the direction from the center of lighting equipment 10 to each LED 20, as in the case of the attached position of LED 20.

FIG. 8 is a diagram illustrating contents registered in LED irradiation direction table TL1. In LED irradiation direction table TL1, for example, attached positions, that is, LED irradiation directions of 180 LEDs 20 attached to 20 regular hexagonal substrates 11A and six regular pentagonal substrates 11B. The attached position of LED 20 is expressed using coordinates (θ, φ) as follows. For example, the attached position of LED 20 No. 1 is (5°, 0°). The attached position of LED 20 No. 2 is (5°, 15°). Similarly, the attached position of LED 20 No. n (n is the maximum value) is (175°, 345°).

For example, of 180 LEDs 20 arranged on lighting equipment 10, LED 20 used for illuminating spotlight is selected using Formula (1).

$$a \cdot b \geq \alpha \quad (1)$$

where, a·b represents an inner product of vector a and vector b, and

α represents a threshold.

Vector a is a vector toward LED 20 arranged on the inner side of and close to the surface of exterior 10z from the center of spherical exterior 10z. Vector b is the lighting direction designated by the user. In the first exemplary embodiment, the lighting direction is designated by the user using coordinates (θ, φ). Threshold a is a threshold for determining the irradiation range of the spotlight, that is, a threshold for determining an LED around the lighting direction to be illuminated. Threshold a may be a value fixed for each lighting equipment 10, or may be set by the user using control terminal 60. When threshold a is of a large value, only LED 20 with vector a in a direction close to the direction of vector b is turned ON, resulting in a small spotlight irradiation range. When threshold a is of a small value, LED 20 with vector a in a direction slightly deviated from the direction of vector b is turned ON, resulting in a large spotlight irradiation range.

In the first exemplary embodiment, the shape of the spotlight illuminated by turning ON LED 20 satisfying Formula (1) is substantially circular. LED 20 to be turned ON may be further extracted from a plurality of LEDs 20 selected with Formula (1) to be used for the spotlight, to change the shape of the spotlight to be a rectangular or elliptical shape. Here, the LED to be turned ON satisfies Formula (1), but the user may directly select the LED to be turned ON without using Formula (1).

Figure 9:
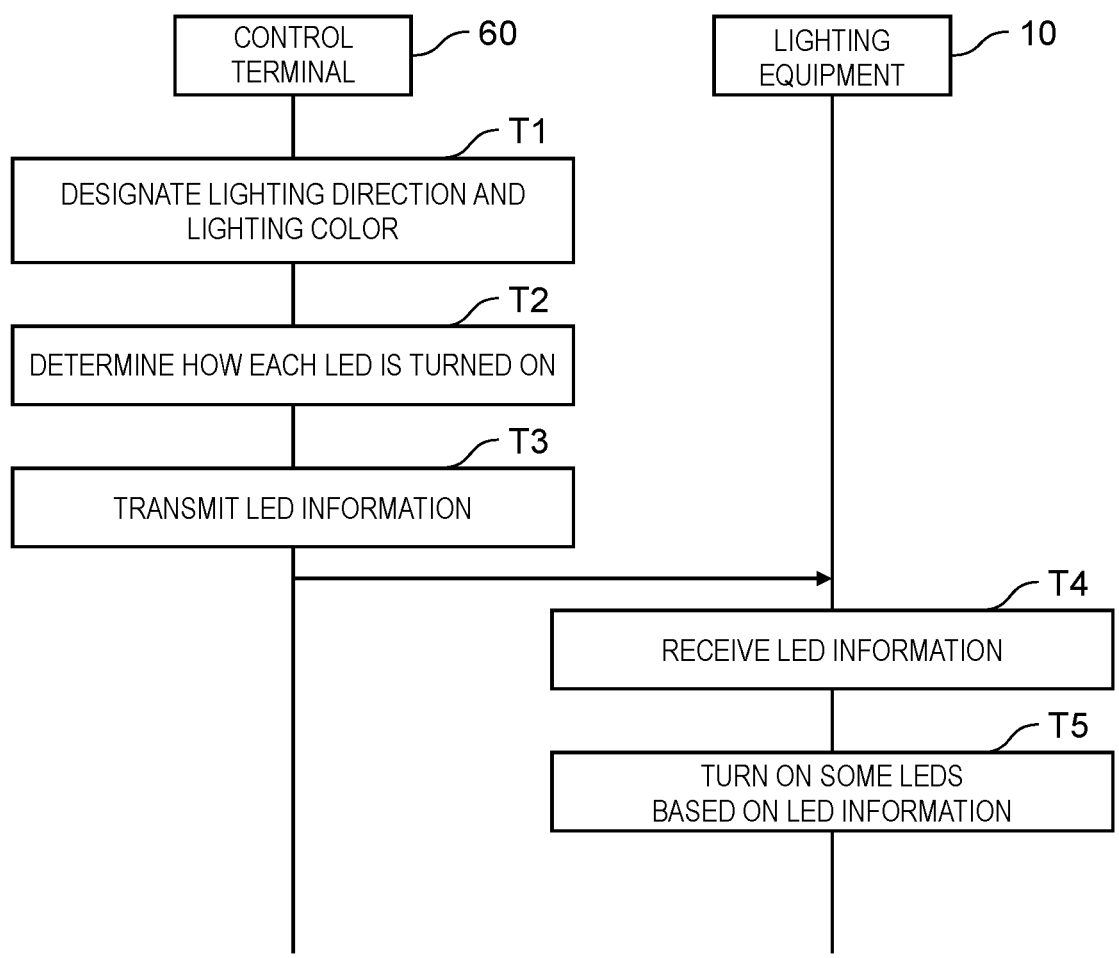
FIG. 9 is a sequence diagram illustrating an operation procedure of the spotlight system.

An operation of spotlight system 5 with the configuration described above will be described. FIG. 9 is a sequence diagram illustrating an operation procedure of spotlight system 5. User hm1 designates the lighting direction and the lighting color of the spotlight by using UI 63 of control terminal 60. UI 63 of control terminal 60 accepts the lighting direction and lighting color of the spotlight designated by user hm1 (T1). Controller 61 determines a turning-ON method for each LED 20 based on the lighting direction and the lighting color designated (T2). Specifically, controller 61 selects LED 20 to be turned ON by using the lighting direction in Formula (1), and acquires the LED number. Furthermore, controller 61 obtains color information corresponding to the lighting color. For example, RGB values are used as color information. The R value, G value, and B value are each set to be in the range of 0 to 255. For example, the maximum value of yellow is R: 255, G: 255, B: 0. The maximum value of purple is R: 128, G: 0, B: 128. The maximum value of black is R: 0, G: 0, and B: 0.

The color information may include information on hue, saturation, and lightness. The lightness may correspond to the brightness of the display. In this case, the color information includes brightness information. The lightness may be different from the brightness of the display. In this case, brightness information may be assumed to be distinguished from the color information.

Communication unit 64 of control terminal 60 transmits the LED irradiation information including the LED number of LED 20 selected and the RGB values, to lighting equipment 10 (T3). Communication unit 34 of lighting equipment 10 receives the LED irradiation information from control terminal 60, and stores the information in storage 32 (T4). Based on the LED irradiation information, controller 31 determines LED 20 to be turned ON among all LEDs 20 mounted to lighting equipment 10, and turns ON part of LEDs 20 (T5).

In spotlight system 5 according to the first exemplary embodiment, the irradiation direction of the spotlight can be quickly moved to a specific direction. In the first exemplary embodiment, LED irradiation direction table TL1 is stored in storage 62 of control terminal 60, but may be stored in storage 32 of lighting equipment 10. In this case, control terminal 60 transmits information including information on the lighting direction and the lighting color to lighting equipment 10 as the LED irradiation information. Controller 31 of lighting equipment 10 acquires the LED irradiation information through communication unit 34, refers to LED irradiation direction table TL1, and selects LED 20 to be turned ON. With LED irradiation direction table TL1 stored in storage 32 of lighting equipment 10, lighting equipment 10 and other control terminal 60 are easily handled as separate products.

In this manner, control terminal 60 (an example of a lighting control device) controls illumination by lighting equipment 10 (an example of a lighting device) capable of illuminating substantially all the directions using the plurality of LEDs 20 (an example of a light source). Control terminal 60 includes controller 61 (an example of the processing unit) that executes processing related to control for illumination. Controller 61 acquires designation information (an example of the direction designation information) for designating the lighting direction (an example of the illumination direction) of lighting equipment 10. Controller 61 may acquire light source information on the LED irradiation direction (an example of the light source irradiation direction) that is an irradiation direction of each of the plurality of LEDs 20. Controller 61 may cause illumination of part of all LEDs 20 based on the illumination direction (an example of the designated illumination direction) expressed by angles θ, φ designated by the designation information on the lighting direction and the LED irradiation directions of the plurality of LEDs 20 registered in LED irradiation direction table TL1.

With this configuration, control terminal 60 can implement a spotlight function without having a pan/tilt function for lighting equipment 10 to change the image capturing direction. Thus, no time is required for moving lighting equipment 10 in the pan direction and the tilt direction for implementing the spotlight function. Thus, control terminal 60 can start spotlight illumination in a predetermined direction desired by the user, in a shorter period of time. Furthermore, no driver for implementing panning/tilting is required, whereby a mechanical configuration of lighting equipment 10 can be simplified. Thus, mechanical failure is less likely to occur, whereby a load related to maintenance can be reduced. Thus, with a simple configuration, control terminal 60 can emit spotlight from lighting equipment 10 swiftly in a direction desired by the user among all the directions.

The designation information on the lighting direction may include information for designating an angle (for example, θ, Φ) of the illumination direction with respect to the reference direction of lighting equipment 10. Thus, lighting control terminal 60 can designate the illumination direction in a direction based on lighting equipment 10.

Furthermore, controller 61 determines the irradiation range (an example of a range of the illumination directions) of lighting equipment 10 based on the designation information on the lighting direction. Controller 61 causes illumination of at least one LED 20 (an example of part of the light source) illuminating in the LED irradiation direction included in the irradiation range. With this configuration, even when the illumination direction expressed by angles θ, φ designated by the designation information on the lighting direction is a single direction, control terminal 60 can make lighting equipment 10 illuminate a range including this single direction.

Controller 61 may acquire threshold a (an example of size designation information) for designating the size of the irradiation range. Controller 61 may determine the irradiation range based on the designation information on the lighting direction and threshold a. With this configuration, control terminal 60 can designate the size (corresponding to threshold a) of the irradiation range to the size desired by the user for example.

First Modification of First Exemplary Embodiment

In the first exemplary embodiment described above, the plurality of LEDs illuminating spotlight are simply turned ON or OFF, and adjustment of brightness of each LED is not taken into consideration. A first modification of the first exemplary embodiment relates to a case where the brightness of these plurality of LEDs is individually changed. With the brightness of each LED used for spotlight increased/reduced, the light amount of spotlight emitted can be changed.

Figure 10:
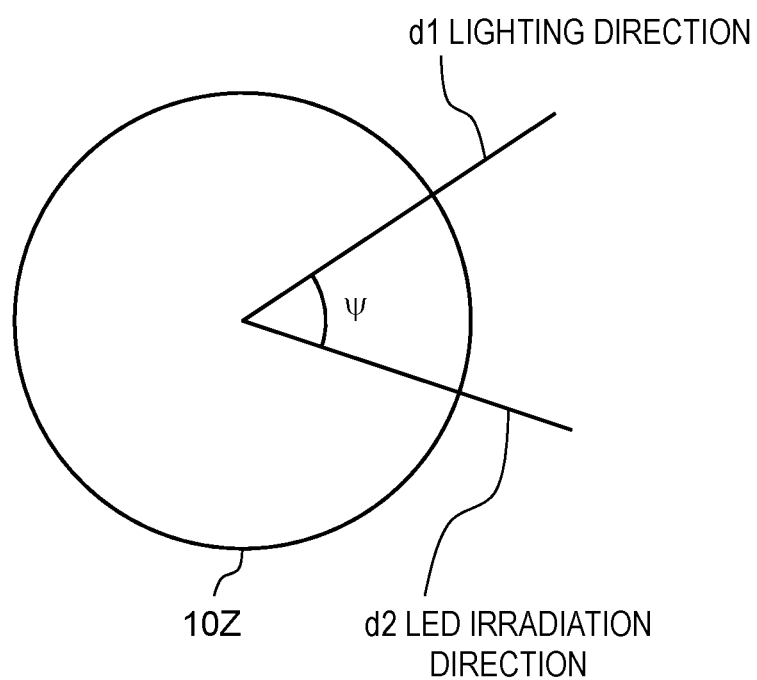
FIG. 10 is a diagram illustrating an angle difference between a lighting direction and an LED irradiation direction.

FIG. 10 is a diagram illustrating an angle difference ψ between lighting direction d1 (designated lighting direction) and LED irradiation direction d2. Angle difference ψ is an angle determined by angle θ and angle φ expressing lighting direction d1 and angle θ and angle φ expressing LED irradiation direction d2 of each LED 20. Larger angle difference ψ indicates a larger deviation between orientations of lighting direction d1 and LED irradiation direction d2. Smaller angle difference ψ indicates a smaller deviation between orientations of lighting direction d1 and LED irradiation direction d2.

Figure 11A:
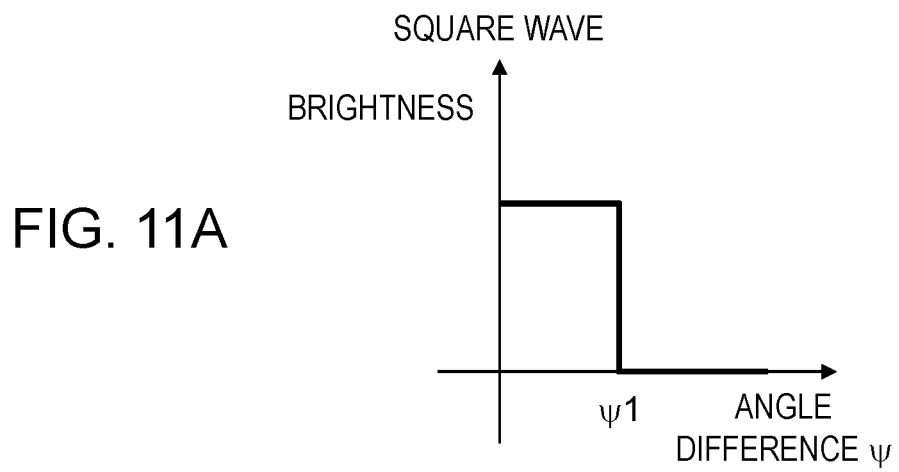
FIG. 11A is a graph illustrating a function of rectangularly obtaining the brightness of the plurality of LEDs arranged around the lighting direction.

FIG. 11A is a graph illustrating a function of rectangularly obtaining the brightness of the plurality of LEDs 20 arranged around lighting direction d1. The vertical axis of this graph represents the brightness of LED 20, and the horizontal axis represents angle difference ψ. Angle ψ1 on the horizontal axis is an angle corresponding to threshold a determining spotlight irradiation range. When the brightness of the plurality of LEDs 20 to be turned ON is changed rectangularly, all LEDs 20 with angle difference ψ between lighting direction d1 and LED irradiation direction d2 being in a range of angle ψ1 are turned ON with the same brightness. LED 20 outside the range of angle difference ψ1 is turned OFF. Thus, the spotlight is illuminated with substantially uniform brightness.

As described above, the brightness of the plurality of LEDs 20 emitting light in respective LED irradiation directions included in the irradiation range may be uniform. With this configuration, control terminal 60 can make lighting equipment 10 emit spotlight (light) of uniform amount within the irradiation range.

Figure 11B:
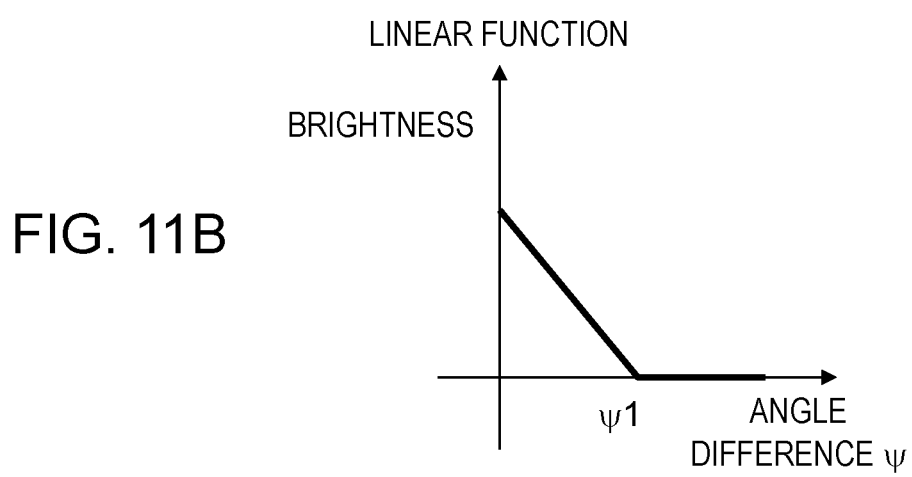
FIG. 11B is a graph illustrating a linear function of obtaining the brightness of the plurality of LEDs arranged around the lighting direction.

FIG. 11B is a graph illustrating a linear function of obtaining the brightness of the plurality of LEDs 20 arranged around lighting direction d1. The graphic expression illustrated in FIG. 11B is the same as the graphic expression illustrated in FIG. 11A. Also when the brightness of the plurality of LEDs 20 turned ON is changed by the linear function based on angle difference iv, the plurality of LEDs 20 with angle difference ψ between lighting direction d1 and LED irradiation direction d2 being within a range of angle ψ1 are turned ON. Of the plurality of LEDs 20, LED 20 corresponding to lighting direction d1 has the highest brightness. The brightness of LED 20 gradually decreases as it gets farther from this center, until angle difference ψ reaches angle difference ψ1. As a result, the brightness of the spotlight illuminated is the highest at the center and decreases toward the circumference. Thus, well contrasted spotlight with which the spotted position (the illumination center position) is easy to identify can be emitted.

As described above, the brightness of the plurality of LEDs 20 emitting light in the respective LED irradiation directions included in the irradiation range may be higher in the LED irradiation direction closer to the designated lighting direction. With this configuration, control terminal 60 can achieve illumination with well contrasted spotlight with a higher brightness in a direction closer to the designated lighting direction.

Figure 11C:
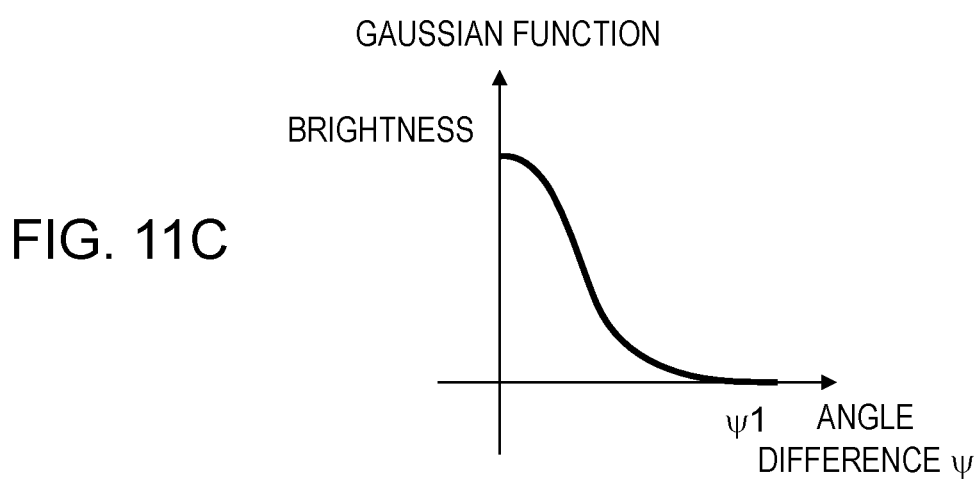
FIG. 11C is a graph illustrating a Gaussian function of obtaining the brightness of the plurality of LEDs arranged around the lighting direction.

FIG. 11C is a graph illustrating a Gaussian function of obtaining the brightness of the plurality of LEDs 20 arranged around lighting direction d1. The graphic expression illustrated in FIG. 11C is the same as the graphic expression illustrated in FIG. 11A. Also when the brightness of the plurality of LEDs 20 turned ON is changed by the Gaussian function based on angle difference ψ, the plurality of LEDs 20 with angle difference ψ between lighting direction d1 and LED irradiation direction d2 being within a range of the angle are turned ON. Of the plurality of LEDs 20, LED 20 in lighting direction d1 has the highest brightness. The brightness of LED 20 gradually decreases as it gets farther from the center, until angle difference ψ exceeds angle ψ1.

When the Gaussian function is used, the brightness of the spotlight changes to be higher in a center part and suddenly drop in a peripheral part, compared with a case where the linear function is used.

Figure 12:
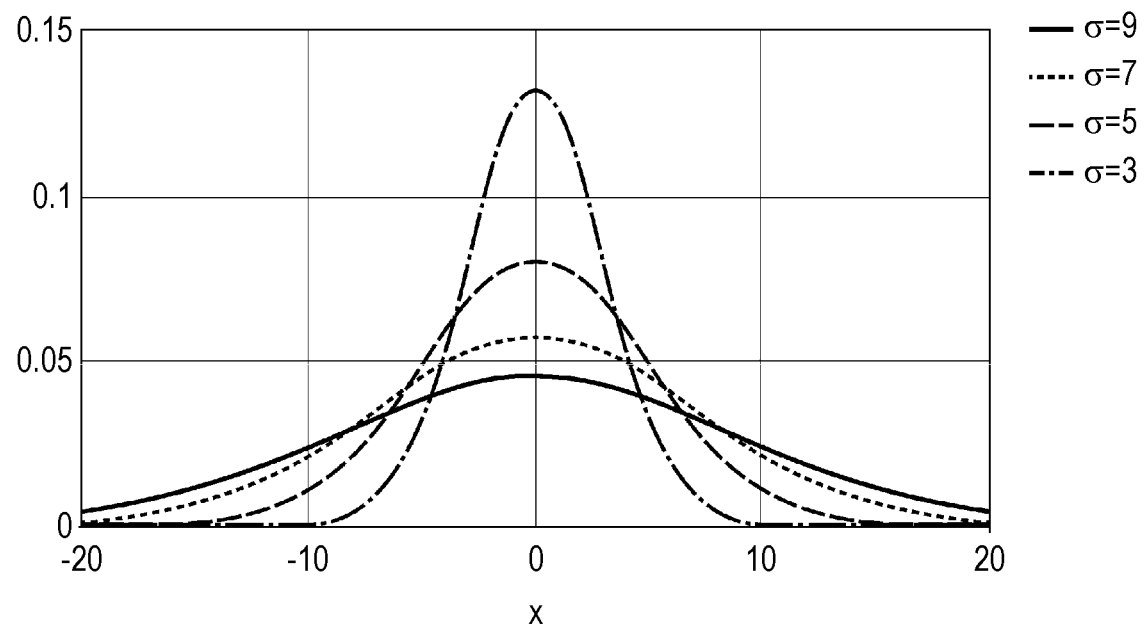
FIG. 12 is a graph illustrating general characteristics of the Gaussian function.

FIG. 12 is a graph illustrating general characteristics of the Gaussian function. The Gaussian function is expressed by Formula (2).

[Math 1]

$$y = \frac{1}{\sqrt{2\pi}\,\sigma} \exp\left\{-\frac{(x-\mu)^2}{2\sigma^2}\right\} \quad (2)$$

where

μ represents constant (a value 0 for example), and

σ represents a variable.

When variable a is changed to a small value, the value of y becomes large resulting in a steep mountain-like shape as the shape of the graph expressed by the Gaussian function. On the other hand, when variable σ is changed to a large value, the value of y becomes small resulting in a gentle mountain-like shape as the shape of the graph expressed by the Gaussian function.

When the Gaussian function is used, a distribution (smoothness of the graph) of the amount of light emitted from the plurality of LEDs 20 changes based on the value of variable a. On the other hand, with the Gaussian function, the area of the Gaussian function does not change depending on the value of variable a. Thus, the total light amount of spotlight emitted by the plurality of LEDs 20 can be made constant. Thus, more smoothly and naturally changing spotlight can be emitted. When the Gaussian function is used, LED 20 with angle difference ψ exceeding the angle ψ1 may be turned ON, resulting in more gently spreading spotlight.

The brightness of the plurality of LEDs 20 emitting light in respective LED irradiation directions included in the irradiation range is based on the Gaussian function. Thus, even when the size of the irradiation range determined by threshold a changes, the brightness can be maintained to be constant over the entirety of the irradiation range.

Second Modification of First Exemplary Embodiment

A second modification of the first exemplary embodiment relates to a case where the lighting device emits light based on a diffusion range of light from an individual LED. The hardware configuration of the spotlight system is the same as that of spotlight system 5 of the first exemplary embodiment illustrated in FIG. 6.

In addition to the LED irradiation direction, diffusion range of each LED 20 is registered as the light source information in LED irradiation direction table TL1 stored in storage 62 of control terminal 60. The diffusion range registered may be common to or different among all LEDs 20. The diffusion range may be set based on information such as the arrangement position, orientation, and emitted light color of LED 20. The diffusion range of the LED means spreading of emitted light from the optical axis that is the irradiation direction of each LED 20.

For illumination based on the LED light diffusion range, after the lighting information such as the lighting direction is accepted from the user, controller 61 of control terminal 60 acquires the diffusion range of each LED 20 from LED irradiation direction table TL1 stored in storage 62. Specifically, controller 61 acquires information on the LED number of LED 20 selected by Formula (1) based on the lighting direction designated by the user and on the light diffusion range of each LED 20. In addition, regardless of Formula (1), the information on the light diffusion range of all LEDs 20 may be acquired.

Next, controller 61 acquires a distance (information on the optical path length) from lighting equipment 10 to an illuminated part. The distance to the illuminated part can be obtained from data on drawing DR1 of the room in which lighting equipment 10 is installed and the like, obtained from the server.

Controller 61 acquires the lighting region in the illuminated part illuminated by lighting equipment 10. Specifically, the lighting region in the illuminated part is designated by the user with UI 63, using drawing DR1 of the room acquired and the like from the server.

Then, controller 61 determines the LED number of LED 20 to be turned ON based on the information on the diffusion range of LED 20, the distance to the illuminated part, and the lighting region, and transmits the LED number to lighting equipment 10 via communication unit 64. LED 20 may be turned ON with ON/OFF control performed for turning ON or OFF as in the first exemplary embodiment, or with brightness changed according to the positions of LEDs 20 as in the first modification of the first exemplary embodiment. For example, the brightness of LED 20 located at the boundary of the irradiation range may be lower than that of other LEDs 20 in the irradiation range.

In the above exemplary embodiment, LED 20 to be turned ON is determined by controller 61 of the control terminal. Alternatively, the LED number of LED 20 to be turned ON by controller 31 of lighting equipment 10 may be determined, with irradiation region in the illuminated part and the distance (information on the optical path length) from lighting equipment 10 to the illuminated part transmitted to lighting equipment 10 via communication unit 64.

With the irradiation range determined based on the diffusion range of light from the LED, the lighting region in the illuminated region desired by the user can be more accurately illuminated. Furthermore, when the diffusion range varies among individual LEDs, the variation of the lighting region corresponding to the designated lighting direction can be suppressed.

Second Exemplary Embodiment

When the lighting equipment is installed on the ceiling to be suspended by a power cable, for example, the upper and lower direction of the lighting equipment is fixed, but the reference direction in the horizontal direction is not fixed. In the first exemplary embodiment, the user arbitrarily sets the reference direction in the horizontal direction, and the lighting direction is expressed by the angle ϕ with respect to the reference direction. For example, the user can also set the reference direction to match a mark on the lighting equipment. In a second exemplary embodiment, a case is described where a camera captures an image of the lighting equipment, and the reference direction in the horizontal direction of the lighting equipment is set based on the captured image. In this case, the user needs not to perform a procedure of setting the reference direction.

A spotlight system of the second exemplary embodiment has substantially the same configuration as that in the first exemplary embodiment described above. Components that are the same as those in the first exemplary embodiment described above will be denoted by the same reference numerals, and the description thereof will be omitted.

Figure 13:
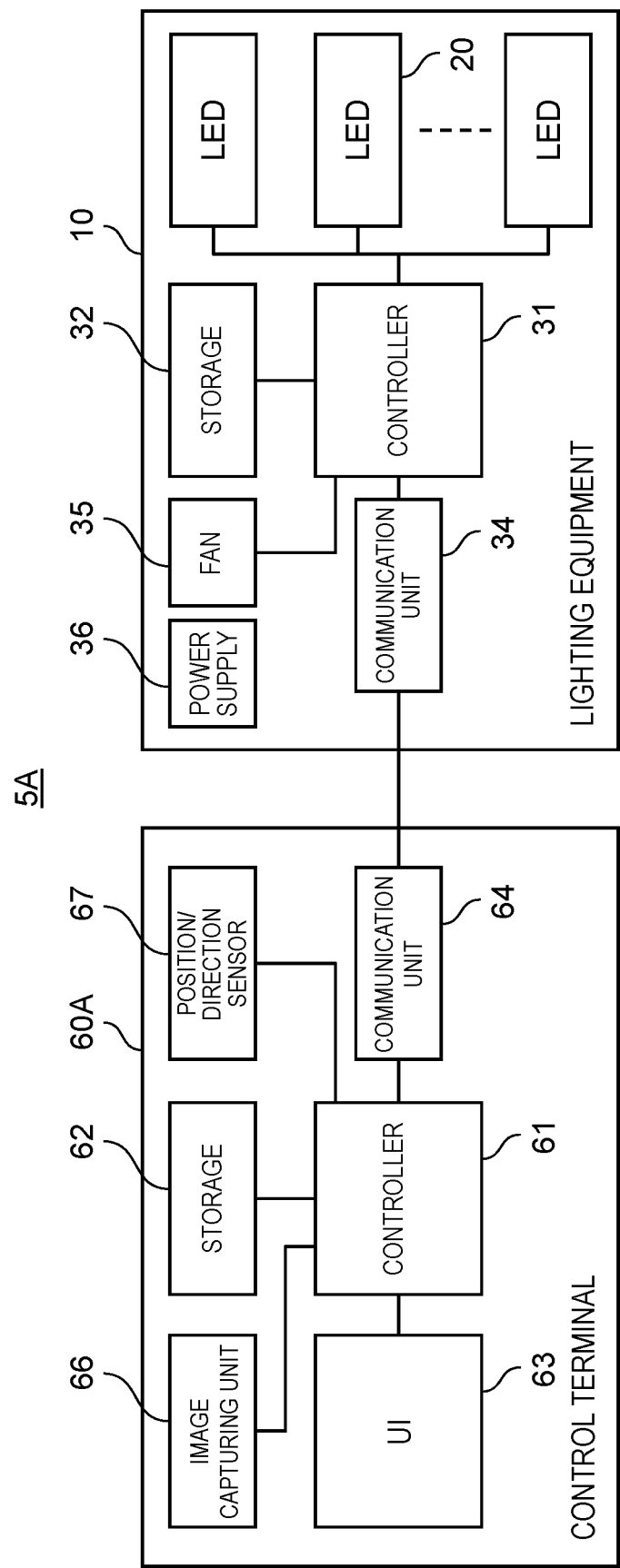
FIG. 13 is a block diagram illustrating a hardware configuration of a spotlight system according to a second exemplary embodiment.

FIG. 13 is a block diagram illustrating a hardware configuration of spotlight system 5A according to the second exemplary embodiment. Control terminal 60A includes image capturing unit 66 and position/direction sensor 67 in addition to the configuration of control terminal 60. Image capturing unit 66 captures an image of lighting equipment 10. Image capturing unit 66 includes an image sensor such as a complementary metal-oxide-semiconductor (CMOS) or a charge coupled device (CCD). Position/direction sensor 67 may incorporate a global positioning system (GPS) receiver capable of acquiring the position (latitude, longitude, altitude) of control terminal 60. Further, position/direction sensor 67 may include a gyro sensor capable of acquiring the orientation of control terminal 60. Beacons may be disposed at respective positions in the room, and position/direction sensor 67 may receive a beacon signal from each beacon, and acquire position information on control terminal 60 based on the intensity of each beacon signal. Further, position/direction sensor 67 may acquire the position information on control terminal 60 based on the received electric field intensity of the radio wave of a wireless LAN.

Figure 14:
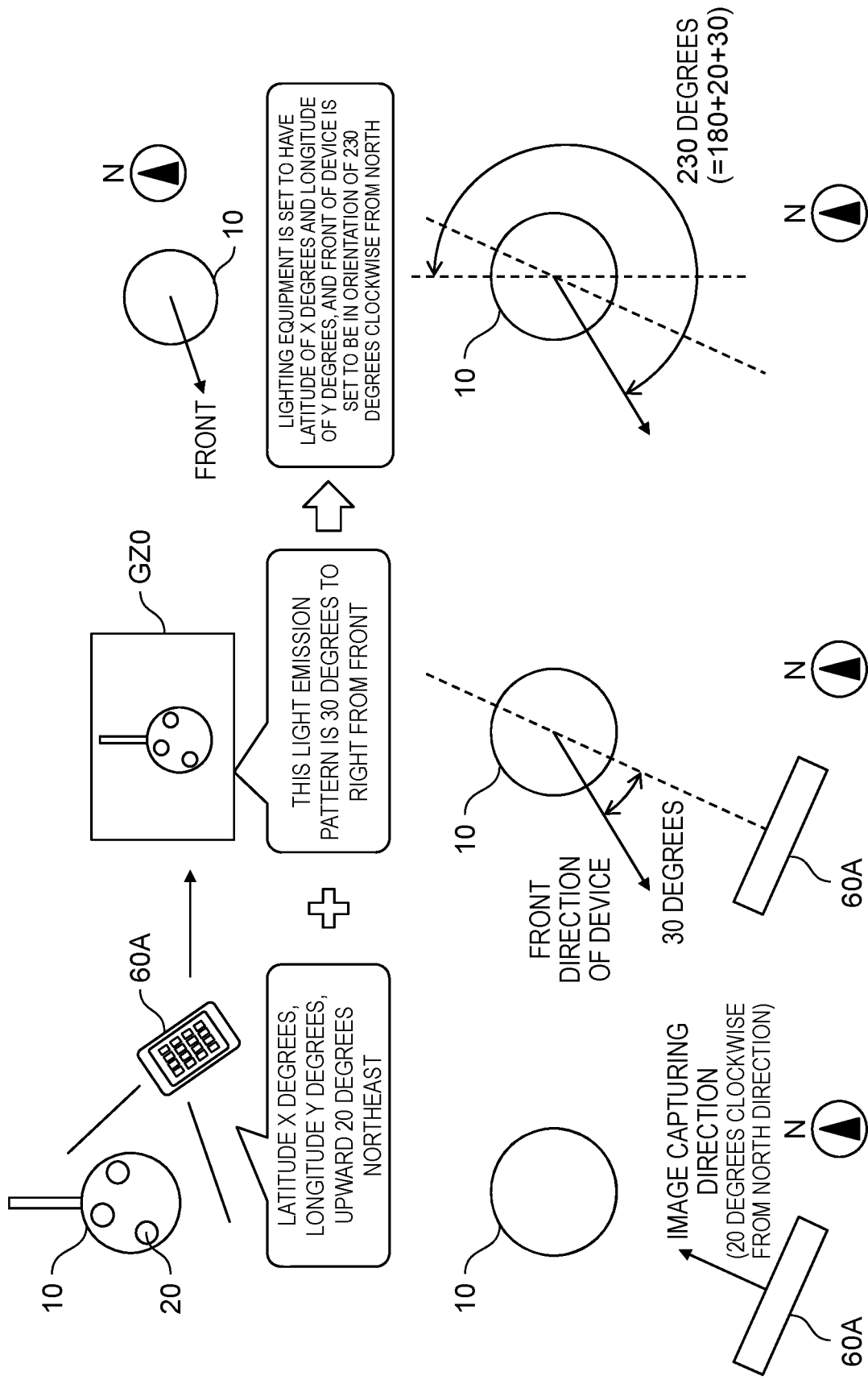
FIG. 14 is a diagram illustrating a method of setting a reference direction of a lighting equipment.

FIG. 14 is a diagram illustrating a method of setting a reference direction of lighting equipment 10. The method of setting the reference direction is performed by the following steps K1 to K4.

Controller 31 of lighting equipment 10 makes at least one LED 20 emit light under a direction determination mode for setting the reference direction (K1). FIG. 14 illustrates a case where three LEDs 20 forming a triangle are turned ON as a specific light emission pattern (specific pattern) of the LEDs. The determination of the direction of lighting equipment 10 is not limited to this example, and controller 31 may make LEDs 20 emit light under various light emission patterns with another polygonal shape formed, light or a specific color emitted, LEDs to be turned ON changed over time, and the like. LEDs 20 disposed on the inner side of the polygonal shape may be turned ON, instead of those on the contour of the polygonal shape.

The specific pattern may be implemented with light emitted based on data on the specific pattern transmitted to lighting equipment 10 from controller 61 of control terminal 60A via communication unit 64. In this case, a communication device other than lighting equipment 10 generates the data on the specific pattern, controller 61 acquires the data on the specific pattern from the communication device via communication unit 64, and LEDs 20 are turned ON to form the specific pattern on lighting equipment 10.

In the state where LEDs 20 are emitting light under the direction determination mode, the user captures an image with control terminal 60A oriented toward lighting equipment 10 (K2). Information on the latitude and longitude of control terminal 60A capturing the image is acquired by position/direction sensor 67. For example, the latitude and the longitude of control terminal 60A are x degrees and y degrees. The height of control terminal 60A may be the same as or different from the height of lighting equipment 10. Information on the orientation of control terminal 60A capturing the image is acquired by position/direction sensor 67. For example, the orientation of control terminal 60A is 20 degrees upward in the northeast direction.

Control terminal 60A reads the light emission pattern of LEDs 20 based on captured image GZ0 captured by image capturing unit 66, and estimates a direction in which the image of lighting equipment 10 has been captured (K3). For example, controller 61 of control terminal 60A stores a table in which the triangular shape formed by the light emission of three LEDs 20 and the orientation of lighting equipment 10 are associated with each other in storage 62 or the like in advance, and acquires the orientation of lighting equipment 10 based on the triangular shape formed by the light emission pattern of three LEDs 20 obtained by captured image GZ0. In FIG. 14, the orientation of control terminal 60A is estimated to be 30 degrees to the right from the front of lighting equipment 10. Furthermore, for example, controller 61 may acquire (obtain) the orientation of lighting equipment 10 by making LEDs 20 positioned on a circle corresponding to the equator of lighting equipment 10 of a spherical shape emit light of different colors, and confirming LED emitting which color is positioned at the center of the captured image.

Controller 61 of control terminal 60A determines the absolute position and the absolute direction of lighting equipment 10 based on the position and direction of control terminal 60A and the direction of lighting device 10 (K4). To obtain the absolute direction of the reference direction of lighting equipment 10, controller 61 of control terminal 60A calculates the absolute direction of the reference direction of lighting equipment 10 based on the image capturing direction of control terminal 60A and the reference direction of lighting equipment 10 with respect to control terminal 60A.

As an example, a case is described where control terminal 60A captures an image of lighting equipment 10 in the horizontal direction. The image capturing direction of control terminal 60A is 20 degrees upward in the northeast direction (clockwise from the north direction). The reference direction of lighting equipment 10 with respect to control terminal 60A is 30 degrees to the right from the front. Therefore, the absolute direction of the reference direction of lighting equipment 10, that is, the longitude, is 230 degrees as a clockwise angle from the north direction is 230 degrees (20 degrees+30 degrees+180 degrees).

This is not limited to the case of image capturing in the horizontal direction, and similarly applies to a case where control terminal 60A captures an image of lighting equipment 10 in an oblique direction. In this case, controller 61 of control terminal 60A performs calculation in a vertical direction, in a manner that is similar to that in the horizontal direction, to obtain the latitude of the reference direction of lighting equipment 10. To obtain the reference direction in the vertical direction of lighting equipment 10, the light emission pattern described above may not be used, and colors of light emitted by the plurality of LEDs 20, arranged in lighting equipment 10, may vary in the vertical direction. For example, the plurality of LEDs 20 may be arranged in lighting equipment 10 with colors of light emitted from LEDs 20 being blue, green, and red in this order from the upper side in the vertical direction. Control terminal 60A can identify the angle of lighting equipment 10 with respect to control terminal 60A in the vertical direction, based on the colors of light emitted from LEDs 20 in the captured image. Thus, by adding the vertical angle of lighting equipment 10 to the vertical angle of control terminal 60A, the latitude of the reference direction in the vertical direction of lighting equipment 10 can be obtained.

Further, when determining the absolute position of lighting equipment 10, controller 61 of control terminal 60A may measure a distance to lighting equipment 10 based on the size of the outer shape of lighting equipment 10 included in captured image GZ0 captured by image capturing unit 66 through image recognition, for example. When control terminal 60A includes a ranging sensor, the distance to lighting equipment 10 may be measured by the ranging sensor. The ranging sensor can measure the distance to lighting equipment 10 from time between projection of infrared light or ultrasonic waves and detection of the reflected light or reflected waves. Controller 61 of control terminal 60A calculates the absolute position (longitude, latitude, altitude) of lighting equipment 10, based on the distance to lighting equipment 10, the direction of control terminal 60A with respect to lighting equipment 10, and the position of control terminal 60A.

Figure 15:
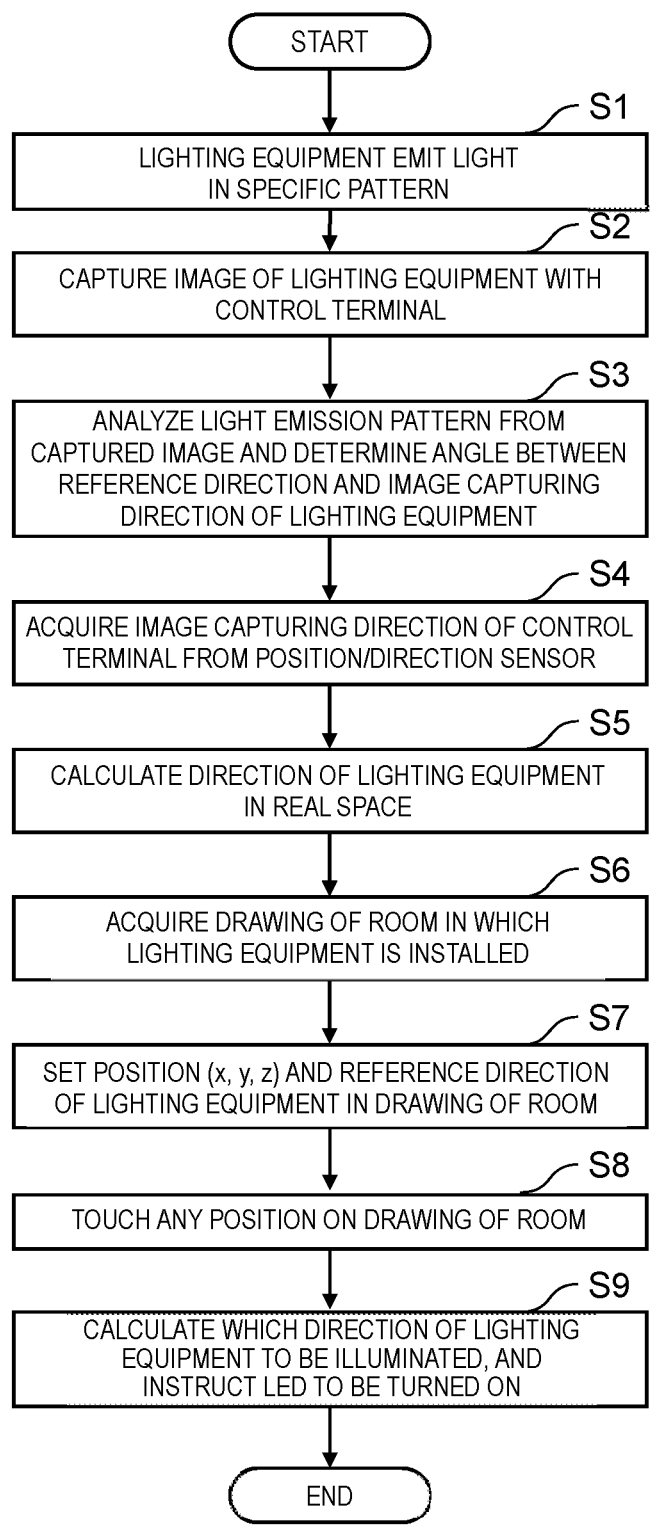
FIG. 15 is a flowchart illustrating a procedure of an operation of setting a reference direction and turning ON a light.

As an example, a situation is assumed where lighting equipment 10 is installed on the ceiling of a room. FIG. 15 is a flowchart illustrating a procedure of an operation of setting the reference direction and turning ON the light. Controller 31 of lighting equipment 10 makes at least one LED 20 emit light under a specific light emission pattern (specific pattern) (S1). Image capturing unit 66 of control terminal 60A captures an image of lighting equipment 10 in accordance with an operation of the user on UI 63, for example (S2). Controller 61 analyzes the light emission pattern in the captured image captured by image capturing unit 66, and calculates the reference direction of the lighting equipment 10 with respect to the image capturing direction (S3).

Controller 61 acquires the image capturing direction of control terminal 60A detected by position/direction sensor 67 (S4). Controller 61 calculates the absolute direction (a direction in a real space) of the reference direction of lighting equipment 10 based on the reference direction of lighting equipment 10 with respect to the image capturing direction and the image capturing direction of control terminal 60A (S5). Controller 61 calculates the absolute position (the position in the real space) of lighting equipment 10, based on the distance from control terminal 60A to lighting equipment 10, the direction of control terminal 60A with respect to lighting equipment 10, and the position of control terminal 60A.

Figure 16:
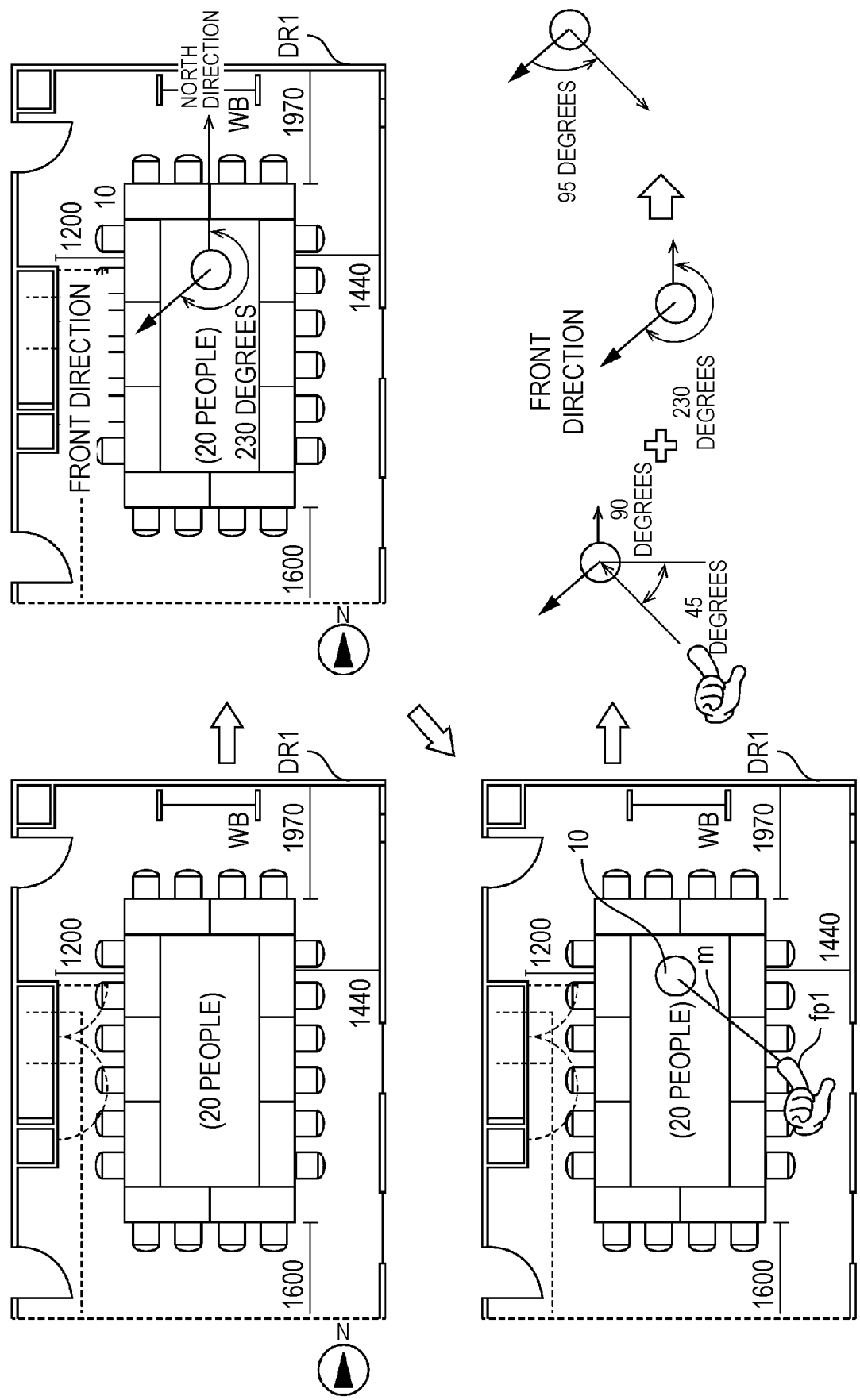
FIG. 16 is a diagram illustrating a specific example of how the lighting direction is set to a direction designated by a user.

Then, communication unit 64 of control terminal 60A communicates with the server connected to the network according to the instruction from the user issued using UI 63, and acquires drawing data on the room in which lighting equipment 10 is installed, by downloading the data (S6). FIG. 16 is a diagram illustrating a specific example of how the lighting direction is set to a direction designated by the user. Controller 61 displays drawing DR1 on UI 63 based on the drawing data downloaded from the server. In drawing DR1, a plan view of the floor plan of the room is drawn. A large table is at the center of the room. A plurality of chairs are placed around the table. Lighting equipment 10 is installed on the ceiling.

Controller 61 may calculate the position (latitude, longitude, height h) of lighting equipment 10 by the method described above. Controller 61 may acquire the position of lighting equipment 10 from, for example, an input operation by the user on UI 63 or the GPS position information on lighting equipment 10. Further, the reference direction of lighting equipment 10 is calculated by controller 61 using the method described above to be set to a direction at 230 degrees from the north direction (S7).

The user performs a touch operation on UI 63. Controller 61 accepts this touch operation, determines that touched position fp1 is the spotlight irradiated position, and acquires position information (latitude, mild) on the position (S8). Here, it is assumed that the irradiation target is the floor surface, and a value of the altitude of which is 0. Controller 61 acquires the direction and distance m to lighting equipment 10 from touched position fp1. Here, an angle of the direction from the touched position fp1 to lighting equipment 10 is 135 degrees from the north direction. On the other hand, the angle of the reference direction of lighting equipment 10 from the north direction is 230 degrees. Thus, lighting equipment 10 emits the spotlight in the direction, counterclockwise angle φ of which in the horizontal direction from the reference direction is 95 degrees.

Controller 61 calculates angle θ in the vertical direction from lighting equipment 10 to touched position fp1 using Formula (3) based on distance m from touched position fp1 to lighting equipment 10 and height h of lighting equipment 10.

$$\theta = \tan^{-1}(m/h) \qquad (3)$$

Height h represents the height of lighting equipment 10 from the floor surface (an example of the irradiated position), but may also represent the height of lighting equipment 10 from a position (for example, the height of control terminal 60 held by the user) at a certain height other than the floor surface. Thus, height h may be a relative height of lighting equipment 10 from the irradiated position, for example.

Controller 61 determines, from the reference direction of lighting equipment 10, the lighting direction to be a direction that is at angle φ that is 95 degrees in the horizontal direction and at angle θ, represented in Formula (3), in the vertical direction. Based on this lighting direction, controller 61 selects LED 20 to be turned ON according to Formula (1). controller 61 transmits the LED irradiation information including the LED number of the selected LED 20 to be turned ON to lighting equipment 10 via communication unit 64, and issues an instruction to turn ON LED 20 (S9). Then, spotlight system 5A terminates the operation.

In spotlight system 5A, image capturing unit 66 of control terminal 60A captures an image of the specific pattern. Alternatively, the image of the specific pattern may be captured by an image capturing device other than control terminal 60A and lighting equipment 10. In this case, controller 61 of control terminal 60A acquires image data (adjustment captured image information) capturing the specific pattern from the image capturing device via communication unit 64, and adjusts the illumination direction of lighting equipment 10 based on the data.

With spotlight system 5A according to the second exemplary embodiment, the user needs not to perform a procedure of setting the spotlight in a certain direction. The reference direction setting method described in the second exemplary embodiment is applied to the lighting equipment that can emit spotlight, as a device for setting the reference direction. Alternatively, the method may be applied to devices other than the lighting equipment, such as a speaker emitting sound in a directional direction or a projector that projects an image, for example.

As described above, control terminal 60A may include image capturing unit 66 that captures an image of lighting equipment 10, and position/direction sensor 67 (an example of a measuring unit) that measures the image capturing direction (absolute direction) from image capturing unit 66 to lighting equipment 10. Controller 61 may obtain the reference direction (relative direction) of lighting equipment 10 with respect to the image capturing direction of image capturing unit 66, based on the captured image captured by image capturing unit 66. Controller 61 may identify the reference direction of lighting equipment 10 using a cardinal direction (absolute direction) of lighting equipment 10 in the real space, based on the image capturing direction of image capturing unit 66 measured, and the reference direction of lighting equipment 10 with respect to the image capturing direction of image capturing unit 66 obtained. With this configuration, even if the reference direction of lighting equipment 10 is difficult to identify, control terminal 60A can identify the reference direction of lighting equipment 10 through calculation by using a result of the detection by control terminal 60A.

Further, the lighting direction designation information may include information for designating the cardinal direction of the illumination direction (such as east, west, north, and south) in the real space. Thus, control terminal 60A can designate the lighting direction using the cardinal direction.

Controller 61 may have information on the cardinal direction that is east, west, south, or north, and acquire drawing DR1 (image of installed area) of the room in which lighting equipment 10 is installed. Controller 61 may associate the cardinal direction in drawing DR1 of the room with the reference direction of lighting equipment 10 identified. As a result, the direction (orientation) of lighting equipment 10 can be associated in drawing DR1 of the room. Thus, control terminal 60A can easily recognize, for example, the irradiation range in drawing DR1 of the room, the positional relationship between each position in drawing DR1 of the room and the position of lighting equipment 10 and the like.

Controller 61 may acquire information on the installation position of lighting equipment 10 in drawing DR1 of the room. Controller 61 may acquire the information on touched position fp1 for designating the position in drawing DR1 of the room as the designation information of the lighting direction. Controller 61 may obtain (calculate, for example), as a horizontal direction component (angle φ) of the lighting direction, a direction from the installation position of lighting equipment 10 in drawing DR1 of the room toward a designated position that is a position designated in drawing DR1 of the room. Thus, control terminal 60A can easily designate the lighting direction desired by the user by using drawing DR1 of the room. When drawing DR1 of the room includes information on a two-dimensional plane along the horizontal direction, control terminal 60A can obtain the horizontal direction component of the lighting direction designated.

Furthermore, controller 61 may calculate a distance between the designated position and the installation position of lighting equipment 10 in drawing DR1 of the room. Controller 61 may calculate a difference between height h of lighting equipment 10 (installation height) and the floor surface (a height of the designated position). Controller 61 calculates angle θ as the up and down direction (gravity direction) component of the lighting direction based on the distance and the difference. Thus, control terminal 60A can easily designate the lighting direction desired by the user by using drawing DR1 of the room. Even when drawing DR1 of the room includes the information on the two-dimensional plane along the horizontal direction but does not include information on the height direction, the vertical direction component of the lighting direction designated can be obtained through calculation, for example.

First Modification of Second Exemplary Embodiment

In the second exemplary embodiment, the user designates the lighting direction by performing a touch operation on the drawing of the room displayed on the UI. As a first modification of the second exemplary embodiment, a case is described where an image captured by the camera is displayed on the UI, and the user performs a touch operation on any position on the captured image to designate the lighting direction.

Figure 17:
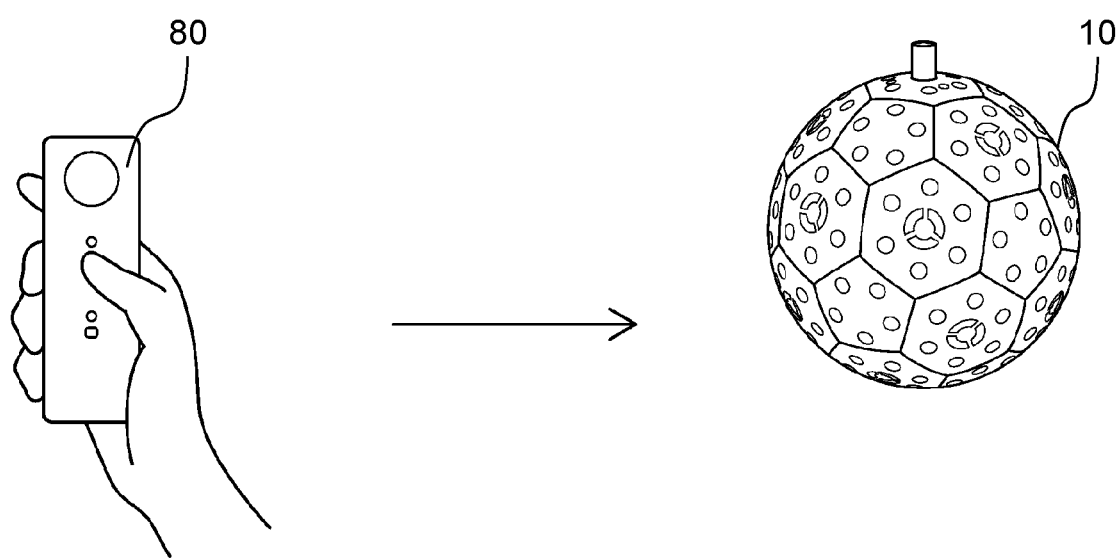
FIG. 17 is a diagram illustrating an appearance of a 360-degree camera and a lighting equipment according to a first modification of the second exemplary embodiment.

FIG. 17 is a diagram illustrating the appearance of 360-degree camera 80 (omnidirectional camera) and lighting equipment 10 in the first modification of the second exemplary embodiment. In the first modification of the second exemplary embodiment, a case is described where the lighting direction is designated by using 360-degree camera 80. Lighting equipment 10 may be installed with the center of lighting equipment 10 of a spherical shape matching the center of the 360-degree camera in advance. Thus, an image capturing range of the 360-degree camera can be matched with the illumination range of lighting equipment 10. Matching between the irradiation range of the lighting equipment and the image capturing range of 360-degree camera 80 can be achieved using the absolute direction (up and down direction and cardinal direction that is east, west, south, or north) or using the reference direction of camera (a front direction of the camera, for example). When lighting equipment 10 is installed, correction can be made for the height of lighting equipment 10 using 360-degree camera 80 immediately below lighting equipment 10 afterward.

First Designation Example

Figure 18:
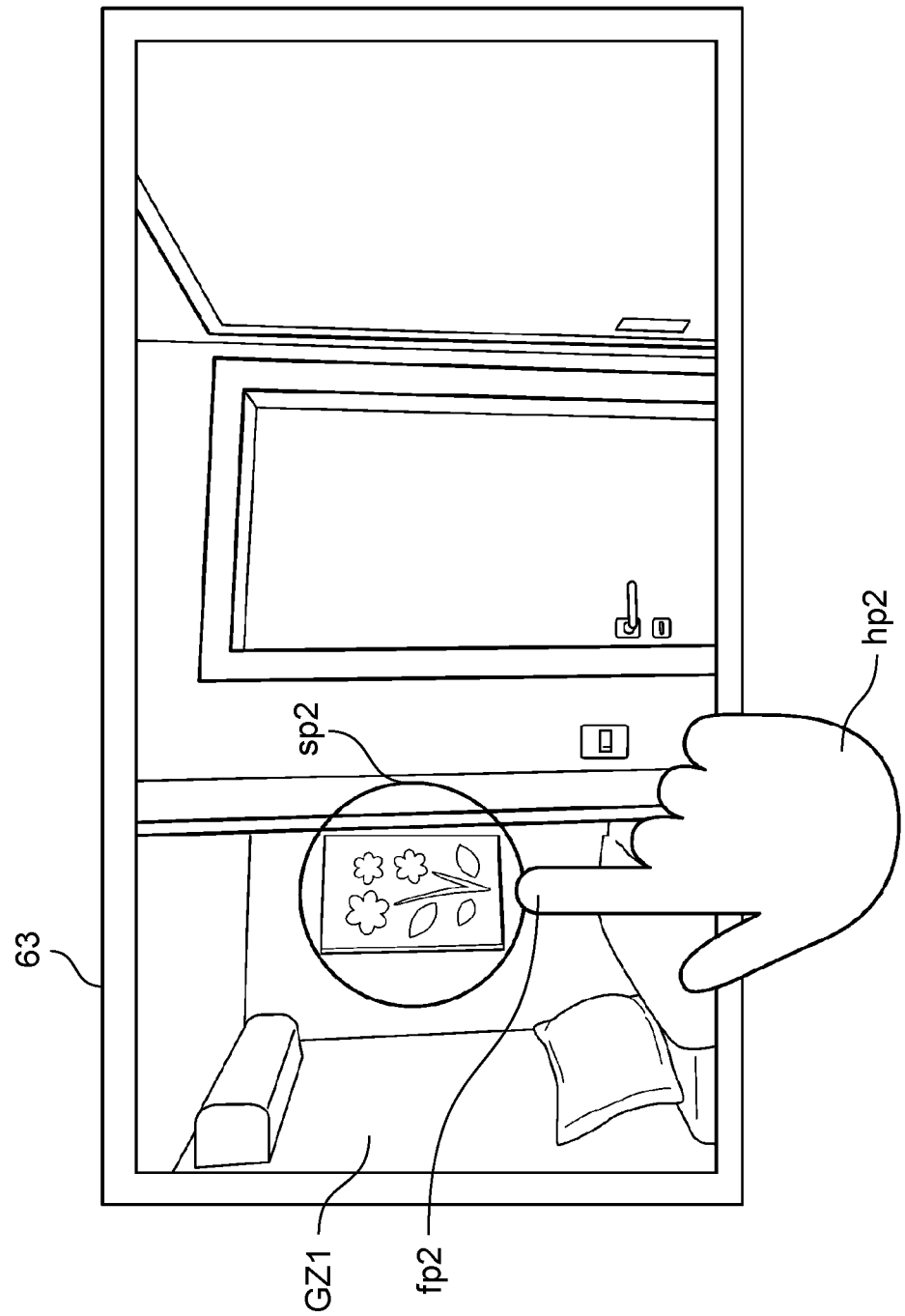
FIG. 18 is a diagram illustrating a first designation example of the lighting direction.

FIG. 18 is a diagram illustrating a first designation example of the lighting direction. Controller 61 causes UI 63 to display field-of-view image GZ1 that is close to the field of view as viewed from a person in the room, in a 360-degree image captured by 360-degree camera 80. In FIG. 18, field-of-view image GZ1 including a part of a door and a window of the room is displayed. When the user performs a drag operation on field-of-view image GZ1 displayed on UI 63, the room in field-of-view image GZ1 displayed on UI 63 continuously changes in a direction opposite to the drag direction. When the user performs the touch operation on UI 63 using his or her finger hp2, controller 61 designates the lighting direction with touched position fp2 being the center position of the spotlight. Lighting equipment 10 emits spotlight sp2 toward touched position fp2. When the user performs a touch operation on the circumference edge of UI 63, the irradiation range of spotlight sp2 may not be completed within the screen of UI 63. When the user performs a pinch-in operation on the screen of UI 63, controller 61 performs an operation of reducing the diameter (size) of the spotlight. Specifically, controller 61 increases threshold a in Formula (1). On the other hand, when the user performs a pinch-out operation on the screen of UI 63, controller 61 performs an operation of expanding the diameter of the spotlight. Specifically, controller 61 reduces threshold a in Formula (1). In this manner, the user can easily designate the lighting direction and irradiation range of the spotlight. Thus, the user can enjoy improved operability.

Second Designation Example

Figure 19:
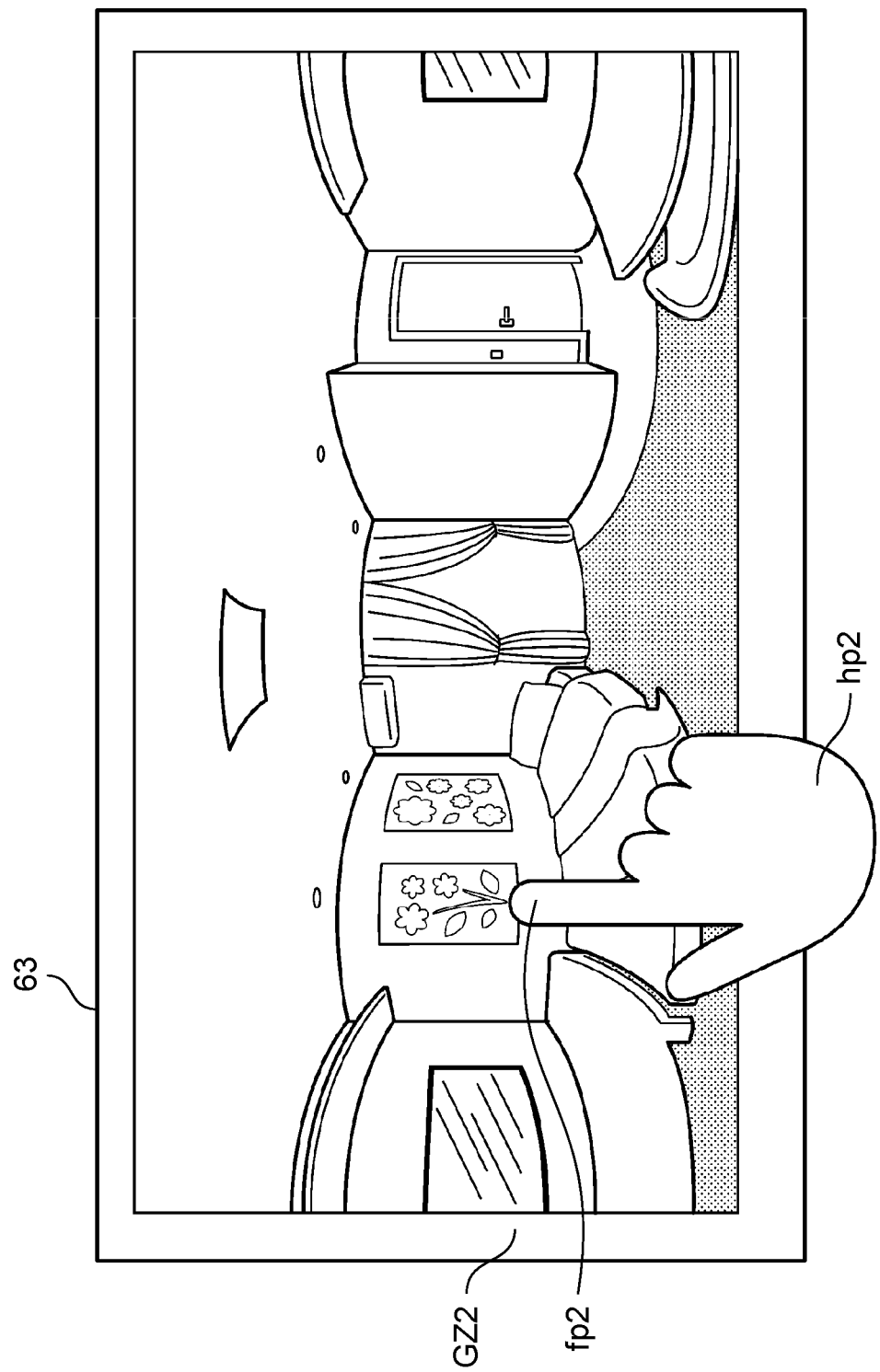
FIG. 19 is a diagram illustrating a second designation example of the lighting direction.

FIG. 19 is a diagram illustrating a second designation example of the lighting direction. Controller 61 converts the 360-degree image captured by 360-degree camera 80 into a two-dimensional image (panoramic image) GZ2, and displays the entire area of the captured image on UI 63. At the corners of panoramic image GZ2, the image is slightly distorted. When the user performs the drag operation on panoramic image GZ2 displayed on UI 63, the center of panoramic image GZ2 displayed on UI 63 changes in accordance with the amount of the drag operation. As a result, for example, the floor surface with a distorted shape in FIG. 19 can be displayed to be at the center of display on UI 63. Thus, the user can designate a specific position on the floor surface as the irradiated position by using the image of the floor surface with less distortion. In the drag operation, panoramic image GZ2 displayed at the center position of UI 63 is simply moved by controller 61, but panoramic image GZ2 may be moved to bring the spotlight at the center position of UI 63.

The operation of designating the lighting direction of the spotlight, the pinch-in operation, and the pinch-out operation by the user on panoramic image GZ2 displayed on UI 63 are similar to those in the first designation example described above. With this configuration, the user can easily designate the lighting direction of the spotlight while viewing the image of the entire room displayed on UI 63. Thus, the user can enjoy improved operability.

Next, various settings using UI 63 will be described.

Figure 20:
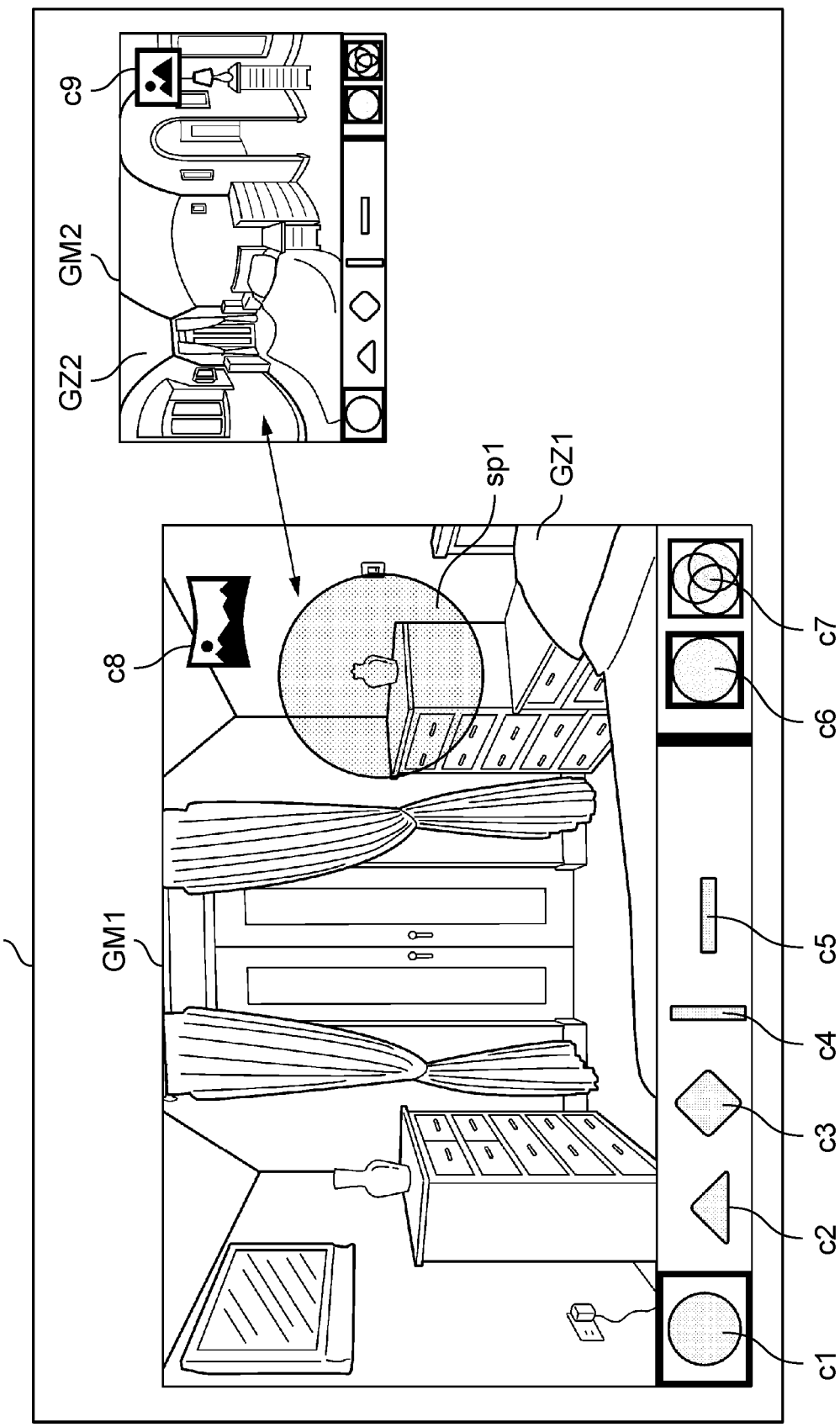
FIG. 20 is a diagram illustrating an example of a user interface (UI) screen.

FIG. 20 is a diagram illustrating an example of a screen of UI 63. On the screen of UI 63, operation screen GM1 including field-of-view image GZ1 and operation screen GM2 including panoramic image GZ2 are displayed to be scalable and switchable from one to the other. In FIG. 20, operation screen GM1 including field-of-view image GZ1 is enlarged and displayed. Icons c1 to c5 for designating the shape of spotlight sp1 and icons c6 and c7 for designating the spotlight count are arranged below operation screen GM1. Icon c1 is an icon for setting the shape of the spotlight to be a circle. Icon c2 is an icon for setting the shape of the spotlight to be a triangle. Icon c3 is an icon for setting the shape of the spotlight to be a rhombus. Icon c4 is an icon for setting the shape of the spotlight to be a vertically long rectangle. Icon c5 is an icon for setting the shape of the spotlight to be a horizontally long rectangle. Icon c6 is an icon for setting the spotlight count to be one. Icon c7 is an icon for setting the spotlight count to be more than one. Thus, there may be a plurality of irradiated positions and irradiation ranges. The spotlight count can be changed in any way based on how the touch operation is performed (such as short pressing, long pressing, double tap, or combination with other icons) on icon c7. Icon c8 for instructing switching to panoramic image GZ2 is disposed on the upper right side of operation screen GM1.

In FIG. 20, operation screen GM2 including panoramic image GZ2 is reduced and displayed. Icons c1 to c5 for designating the shape of spotlight sp1 and icons c6 and c7 for designating the spotlight count are disposed below operation screen GM2, as in the case of operation screen GM1. Icon c9 for instructing switching to field-of-view image GZ1 is disposed on the upper right side of operation screen GM2.

Controller 61 can move the position of and change the size of the spotlight, in response to the drag operation or the pinch-in or the pinch-out operation on operation screen GM1, GM2 via UI 63. Furthermore, in response to a movement of two fingers, touching the screen, along the circumference of same circle, controller 61 may rotate the shape of the spotlight in an orientation of the movement of the fingers. Controller 61 can change the shape of the spotlight to a desired shape, in response to the selection of any one of icons c1 to C5 using UI 63. Controller 61 can change the spotlight count to one or more than one, in response to the selection of icon c6, c7 using UI 63. Controller 61 can switch between operation screen GM1 including field-of-view image GZ1 and operation screen GM2 including panoramic image GZ2, in response to the selection of icon c8, c9 using UI 63. With this configuration, the user can easily designate various spotlight lighting methods (such as the lighting direction, lighting shape, irradiated position, and irradiation range), and thus can enjoy largely improved operability. The shape of the spotlight may be a ring shape.

When controller 61 acquires the information of the spotlight shape set by the user via the UI 63, controller 61 turns ON a plurality of LEDs 20 to be turned ON with the irradiation range having this spotlight shape.

Thus, controller 61 may acquire information (shape designation information) on the shape of the spotlight for designating the shape of irradiation range of lighting equipment 10. Controller 61 may determine the irradiation range of lighting equipment 10 based on the information on the lighting direction and the information on the shape of the spotlight. Thus, control terminal 60A can set the shape of the spotlight to, for example, be a shape desired by the user.

Further, controller 61 may acquire an omnidirectional image (for example, a panoramic image) from 360-degree camera 80 (an example of an omnidirectional image capturing device) that captures an omnidirectional image including the illumination direction in which lighting equipment 10 can emit light. Controller 61 may acquire touched position fp2 (information) for designating the position in the omnidirectional image as the information on the lighting direction. Controller 61 may calculate, as the designated lighting direction, a direction from the installation position of lighting equipment 10 toward the designated position that is a position designated on the omnidirectional image. Thus, the user can determine the designated lighting direction, through a simple operation such as a touch operation on the omnidirectional image that can be illuminated by lighting equipment 10, for example.

Controller 61 may associate the reference direction for image capturing by 360-degree camera 80, with the reference direction for illumination by lighting equipment 10. Thus, control terminal 60A enables easier operation due to the associated positional relationship between the camera operation and the lighting operation.

Controller 61 may acquire operation information on a pinch operation (pinch in and pinch out) on the omnidirectional image. Controller 61 may change (control) the size of the irradiation range based on the operation information. With this configuration, the user can intuitively change the irradiation range through a simple operation such as a touch operation on the omnidirectional image, for example.

A plurality of lighting directions may be designated. There may be a plurality of irradiation ranges including the designated lighting directions. Thus, illumination can be performed in the plurality of irradiation ranges at once, for example. Thus, irradiation of a plurality of irradiation ranges, which is difficult when spotlight emitted in a certain direction is panned/tilted, can be implemented with the spotlight system of the present embodiment, whereby a degree of freedom of illumination can be improved.

Second Modification of Second Exemplary Embodiment

Figure 21:
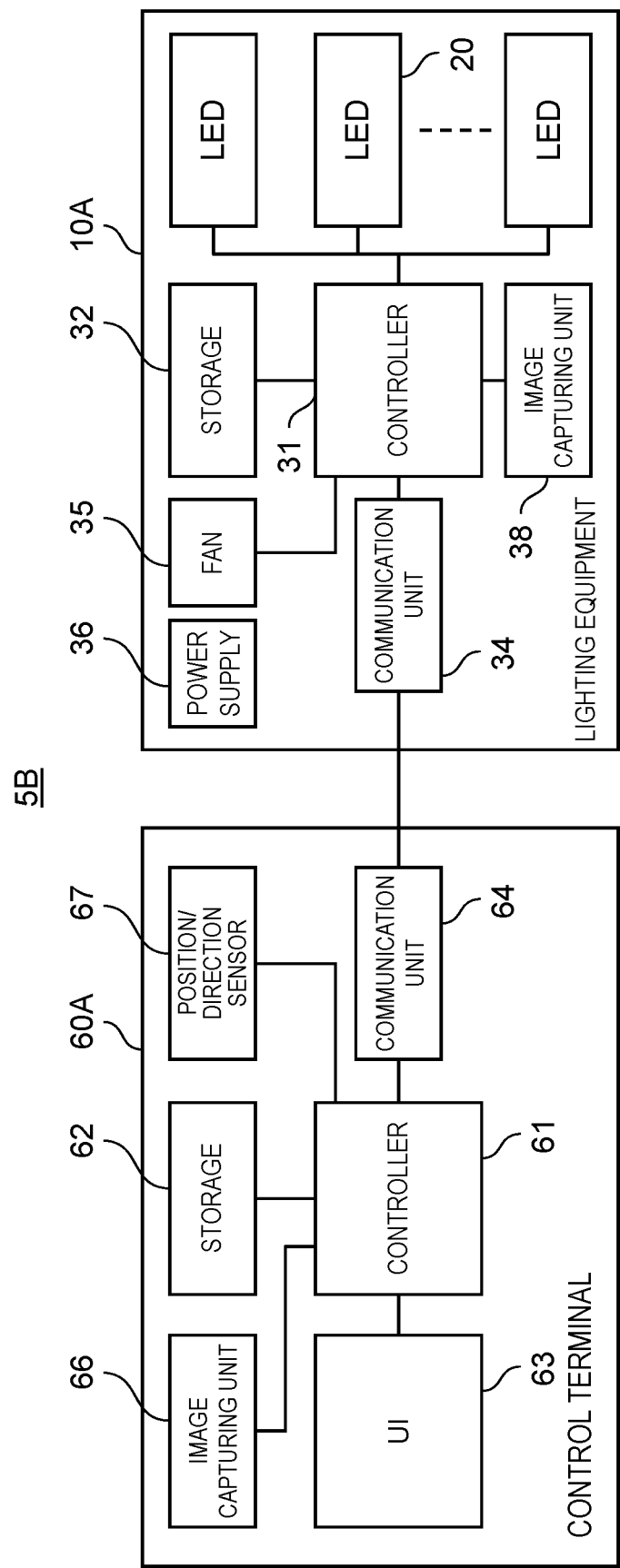
FIG. 21 is a diagram illustrating a hardware configuration of a spotlight system according to a second modification of the second exemplary embodiment.

In a second modification of the second exemplary embodiment, a case is described where the lighting direction is designated using a camera mounted to the lighting equipment. FIG. 21 is a diagram illustrating a hardware configuration of spotlight system 5B according to the second modification of the second exemplary embodiment. Components that are the same as those in the second exemplary embodiment described above will be denoted by the same reference numerals, and the description thereof will be omitted.

Lighting equipment 10A includes image capturing unit 38 in addition to the configuration of lighting equipment 10 described above. Image capturing unit 38 may be attached to lighting equipment 10A to have the optical axis orientated in the reference direction of lighting equipment 10A, for example. Controller 31 of lighting equipment 10A acquires the captured image captured by image capturing unit 38, and transmits the image to control terminal 60A via communication unit 34. Controller 61 of control terminal 60A displays the received captured image on UI 63. The user designates the lighting direction of the spotlight on the captured image displayed on UI 63. As in the second exemplary embodiment, the illumination range of lighting equipment 10A matches the image capturing range of image capturing unit 38, and thus the lighting direction can be easily designated.

In spotlight system 5B according to the second modification of the second exemplary embodiment, the inside of the room in which lighting equipment 10A is installed is designated using the captured image obtained by lighting equipment 10A, for example, whereby the image capturing range and the illumination range can be easily matched. Lighting equipment 10A requires no 360-degree camera provided separately from lighting equipment 10A, and thus no alignment between the 360-degree camera and lighting equipment 10A is required, whereby initial setting can be simplified. As image capturing unit 38, a camera with a fixed angle of view, a zoom camera, a 360-degree camera, and the like may be used.

Third Exemplary Embodiment

A spotlight system of a third exemplary embodiment has substantially the same configuration as that in the second exemplary embodiment described above. Components that are the same as those in the second exemplary embodiment described above will be denoted by the same reference numerals, and the description thereof will be omitted. In the third exemplary embodiment, controller 61 of control terminal 60A sets the reference direction of lighting equipment 10 using the method that is the same as that in the second exemplary embodiment, and controls light emission from each LED 20 in the absolute direction (cardinal direction that is east, west, south, or north) based on the reference direction.

As an example, a situation is assumed where the lighting equipment is installed in a room without a window. When lighting equipment 10 simulates the sun, controller 61 may acquire the positional information acquired by position/direction sensor 67 of control terminal 60A as well as date and time information. Controller 61 may acquire, from storage 62 or from the external server via communication unit 64, information on the sun in a day (for example, information on the cardinal direction in which the sun is positioned at each time and location, color information on the sun at each time and location, and color information on the sky around the sun at each time and location). Controller 61 estimates the position of the sun for a location of control terminal 60A (that is, proximity of the position of the lighting equipment) based on the information on the sun, the positional information, the date and time information, and the like thus acquired. Controller 61 may determine the lighting direction to set the estimated position of the sun to be the spotlight position, and make the plurality of LEDs 20 arranged on lighting equipment 10 emit light. Controller 61 may set color information on each LED 20 to be close to the color of the sun including the color of the rising or setting sun, based on the information on the sun, the positional information, the date and time information, and the like thus acquired. Controller 61 may assume that the blue sky surrounds the sun, and set the color information on each LED 20 corresponding to the periphery of the sun so as to have a color close to the blue sky, based on the information on the sun, the positional information, the date and time information, and the like thus acquired. Thus, the spotlight can make the user in the room with no window feel the sun, from the sunrise to sunset, as if he or she is outdoors. The sky around the sun may be simulated with the irradiation range designated to include all LEDs 20 and all LEDs 20 emitting light, or with irradiation range designated to include part of LEDs 20 and part of LEDs 20 emitting light.

Lighting equipment 10 may illuminate as if the sun never sets, as in a region of the midnight sun such as Scandinavian countries. Controller 61 may acquire climate information from the server connected via communication unit 64, and cause each LED 20 to emit light in accordance with the weather information such as cloudy. While the case where the spotlight simulate the sun is described, the spotlight may simulate the stars, planets, or the like during night time.

First Modification of Third Exemplary Embodiment

In the third exemplary embodiment, the color information on each LED 20 is set in accordance with the date and time information and the color information on the sun acquired by controller 61. As a modification of the third exemplary embodiment, an image signal may be acquired, and the color of each LED 20 may be set in accordance with the signal.

For example, when an image signal distributed to other display devices such as a projector or a display panel is sent to lighting equipment 10 connected via a distributor, lighting equipment 10 may control light emitted from LED 20 based on color information/brightness information on the image signal received, for example, RGB values or YCM values of the image. Specifically, when lighting equipment 10 is controlled while being linked with a device that displays an image such as a not-shown image display device such as a display device or an image projection device such as a projector, light emission from LED 20 may be controlled based on the linked image signal. In the modification of the third exemplary embodiment, lighting equipment 10 receives the image signal and controls light emission from LED 20. Alternatively, control terminal 60 may receive the image signal, and controller 61 of control terminal 60 may convert the signal into information for controlling light emission from LED 20, and notify lighting equipment 10 of light emission control information on LED 20 via communication unit 64 of control terminal 60 to implement the light emission control on LED 20.

Fourth Exemplary Embodiment

In the second exemplary embodiment, the case is described where the lighting equipment emits light in a specific pattern, and the image of the specific pattern is captured for setting the reference direction of the lighting equipment. In a fourth exemplary embodiment, a case is described where a sensor of the lighting equipment sets the reference direction of the lighting equipment will be described. FIG. 22 is a diagram illustrating a hardware configuration of spotlight system 5C according to the fourth exemplary embodiment. Spotlight system 5C of the fourth exemplary embodiment is different from spotlight system 5 of the first exemplary embodiment in that lighting equipment 10C includes measuring unit 39. Components that are the same as those in the first exemplary embodiment described above will be denoted by the same reference numerals, and the description thereof will be omitted.

Measuring unit 39 includes a geomagnetic sensor that detects the installation state of lighting equipment 10C. Measuring unit 39 may further include a gyro sensor. Controller 31 of lighting equipment 10C acquires sensor information indicating the installation state of lighting equipment 10C from measuring unit 39, and transmits the information to control terminal 60 via communication unit 34. Controller 61 of control terminal 60 acquires the sensor information via communication unit 34, adjusts the illumination direction based on the sensor information acquired, and transmits LED irradiation information including the lighting direction and the like to lighting equipment 10C to emit light from lighting equipment 10C.

Specifically, the geomagnetic sensor acquires, as the sensor information indicating the installation state of lighting equipment 10C, data indicating deviation of the reference direction in the horizontal direction of lighting equipment 10C from the reference direction (north direction) in the real space. Furthermore, the gyro sensor acquires, as the sensor information indicating the installation state of lighting equipment 10C, data on inclination of lighting equipment 10C from the vertical direction. Controller 61 of control terminal 60 corrects angle data indicating the LED irradiation direction in LED irradiation direction table TL1, while taking into consideration the data on the deviation of the reference direction in the horizontal direction and the inclination of the lighting equipment in the vertical direction, and selects the corresponding LED 20 based on the lighting direction designated by the user.

With the lighting equipment thus including the geomagnetic sensor and the gyro sensor, even when the installation state of the lighting equipment is deviated from the expected direction, the illumination direction of the lighting equipment can be corrected based on the deviation. Thus, an operation of aligning the reference direction of the lighting equipment with the reference direction in the real space when installing the lighting equipment can be omitted.

Other Exemplary Embodiments

Various exemplary embodiments are described with reference to the drawings, but it is a matter of course that the present disclosure is not limited to such examples. It is obvious that a person skilled in the art can come up with various modifications or variations within the scope of the claims, and it should be understood that these also naturally falls within the technical scope of the present disclosure.

In each of the above exemplary embodiments, a case is described where the spotlight is installed on the ceiling, but the present disclosure is similarly applicable to cases where the spotlight is installed on any location such as a wall surface, a floor surface, or the like.

In each of the above exemplary embodiments, the lighting equipment may not have a spherical shape, and may be of a shape with various polyhedron and curved surfaces as long as LEDs are arranged to emit light in respective directions extending radially from the center of the lighting equipment. The lighting equipment may be a polyhedron in which the light is emitted from LEDs 20 radially from the center of the lighting equipment. When the diameter (size) of the spotlight is determined, weighting coefficients of the directions of angle θ and angle φ may be varied to obtain spotlight of an elliptical shape.

In each of the above exemplary embodiments, the lighting equipment is an example of a lighting device capable of illuminating in all the directions by a plurality of light sources, but may be difficult, unable, or unrequired to emit light in some directions. For example, the lighting equipment may be difficult, unable, or unrequired to emit light in a direction where a cable or socket for installing lighting equipment is present, and thus the light may not be emitted in this direction. Furthermore, due to other reasons, the lighting equipment may be capable of illuminating the periphery of the lighting device excluding some directions, without emitting light in such some directions. Also in this case, in each of the above exemplary embodiments, the lighting equipment may be referred to as the lighting equipment capable of emitting light in all the directions.

In each of the above exemplary embodiments, the lighting equipment itself may be provided with a UI (for example, an operation unit and a display unit) similar to UI 63 included in the control terminal. For example, the lighting equipment may include a light shape switching button. The lighting equipment may include a part of the functions of the control terminal.

In each of the above exemplary embodiments, each LED 20 emits light in the irradiation range of the spotlight, but part of the plurality of LEDs 20 emitting light in the irradiation range of the spotlight and remaining LEDs 20 may not emit light. For example, in the plurality of LEDs 20 emitting light in the irradiation range of the spotlight, LEDs 20 emitting light and LEDs 20 not emitting light may be arranged side by side. In this case, LEDs 20 emitting light and LEDs 20 not emitting light can be alternately arranged.

In each of the above exemplary embodiments, the processor may have any physical configuration. If a programmable processor is used, the processing contents can be changed by changing the program, whereby a high degree of freedom in processor design can be achieved. The processor may be composed of one semiconductor chip, or may be physically composed of a plurality of semiconductor chips. When a plurality of semiconductor chips are used, different semiconductor chips may implement control of the respective exemplary embodiments. In this case, the plurality of semiconductor chips may be regarded as forming a single processor. The processor may be formed by a member (such as a capacitor) having a function different from that of the semiconductor chip. Furthermore, a single semiconductor chip may be configured to implement the function of the processor and other functions. Further, a plurality of processors may be configured by one processor.

The above exemplary embodiments may be combined as appropriate.

The present disclosure is useful for a lighting control device, a lighting control system, a lighting control method, and the like with which lighting can be swiftly performed in a direction desired by the user, of all the directions, with a simple configuration.

What is claimed is:

1. A lighting control device that controls illumination of a lighting device using a plurality of light sources, the lighting control device comprising:
   a processing unit that executes processing related to control on the illumination,
   wherein the processing unit
   acquires direction designation information for designating at least one illumination direction to which the lighting device illuminates,
   acquires light source information indicating a plurality of light source irradiation directions that are irradiation directions of the plurality of light sources, and based on (i) at least one designated illumination direction that is the at least one illumination direction designated by the direction designation information and (ii) the plurality of light source irradiation directions, causes part of the plurality of light sources to illuminate.

2. The lighting control device according to claim 1, wherein the direction designation information includes information designating an angle of the at least one designated illumination direction with respect to a reference direction of the lighting device.

3. The lighting control device according to claim 1, wherein
the processing unit
determines at least one range of the at least one illumination direction to which the lighting device illuminates, based on the direction designation information, and
causes the part of the plurality of light sources to illuminate in a light source irradiation direction included in the at least one range of the at least one illumination direction, the light source irradiation direction being each of the plurality of light source irradiation directions.

4. The lighting control device according to claim 3, wherein
the processing unit
acquires size designation information for designating a size of the at least one range of the at least one illumination direction, and
determines the at least one range of the at least one illumination direction based on the direction designation information and the size designation information.

5. The lighting control device according to claim 3, wherein
the processing unit
acquires information on a diffusion range of illumination light of each of the plurality of light sources,
acquires information on an optical path length that is a distance from the lighting device to an illuminated part,
acquires a lighting region in the illuminated part, and
determines the at least one range of the at least one illumination direction based on the information on the diffusion range of the illumination light, the information on the optical path length, and the lighting region.

6. The lighting control device according to claim 3, wherein
the processing unit
acquires shape designation information for designating a shape of the at least one range of the at least one illumination direction, and
determines the at least one range of the at least one illumination direction based on the direction designation information and the shape designation information.

7. The lighting control device according to claim 3, wherein brightness of the part of the plurality of light sources is uniform.

8. The lighting control device according to claim 3, wherein brightness of the part of the plurality of light sources is higher in the light source irradiation direction closer to the at least one designated illumination direction.

9. The lighting control device according to claim 8, wherein the brightness of the part of the plurality of light sources is based on a Gaussian function.

10. The lighting control device according to claim 1, wherein the processing unit causes the plurality of light sources to illuminate to form a specific pattern, and adjusts the at least one illumination direction based on the specific pattern.

11. The lighting control device according to claim 10, further comprising a communication unit that communicates with a communication device other than the lighting device,
wherein the specific pattern is input by the communication device via the communication unit.

12. The lighting control device according to claim 10, further comprising a communication unit that communicates with an image capturing device other than the lighting device,
wherein the processing unit acquires adjustment captured image information generated as a result of the image capturing device capturing an image of the specific pattern of the lighting device via the communication unit, and adjusts the at least one illumination direction based on the adjustment captured image information.

13. The lighting control device according to claim 12, wherein the adjustment captured image information is an image captured by the image capturing device.

14. The lighting control device according to claim 1, wherein
the lighting device includes a measuring unit that detects an installation state of the lighting device, and
the processing unit adjusts the at least one illumination direction based on sensor information indicating the installation state of the lighting device.

15. The lighting control device according to claim 14, wherein the measuring unit includes a geomagnetic sensor.

16. The lighting control device according to claim 15, wherein the measuring unit further includes a gyro sensor.

17. The lighting control device according to claim 1, further comprising:
an image capturing unit that captures an image of the lighting device; and
a measuring unit that measures an image capturing direction from the image capturing unit toward the lighting device,
wherein the processing unit
calculates a reference direction of the lighting device with respect to the image capturing direction of the image capturing unit based on a captured image captured by the image capturing unit, and
based on the image capturing direction of the image capturing unit measured, and the reference direction of the lighting device with respect to the image capturing direction of the image capturing unit calculated, identifies the reference direction of the lighting device with a cardinal direction in a real space.

18. The lighting control device according to claim 14, wherein the direction designation information includes information for designating a cardinal direction in a real space corresponding to the at least one designated illumination direction.

19. The lighting control device according to claim 17, wherein the direction designation information includes information for designating a cardinal direction in the real space corresponding to the at least one designated illumination direction.

20. The lighting control device according to claim 17, wherein
the processing unit
acquires an image of an installed area in which the lighting device is installed, the image including information on the cardinal direction, and associates the cardinal direction in the image of the installed area with the reference direction of the lighting device identified.

21. The lighting control device according to claim 18, wherein
the processing unit
acquires an image of an installed area in which the lighting device is installed, the image including information on the cardinal direction, and
associates the cardinal direction in the image of the installed area with the reference direction of the lighting device identified.

22. The lighting control device according to claim 20, wherein
the processing unit
acquires information on an installation position of the lighting device in the image of the installed area,
acquires, as the direction designation information, information for designating a position in the image of the installed area, and
calculates, as a horizontal direction component of the at least one designated illumination direction, a direction from the installation position of the lighting device in the image of the installed area toward a designated position that is the position designated in the image of the installed area.

23. The lighting control device according to claim 21, wherein
the processing unit
acquires information on an installation position of the lighting device in the image of the installed area,
acquires, as the direction designation information, information for designating a position in the image of the installed area, and
calculates, as a horizontal direction component of the at least one designated illumination direction, a direction from the installation position of the lighting device in the image of the installed area toward a designated position that is the position designated in the image of the installed area.

24. The lighting control device according to claim 22, wherein
the processing unit
calculates a distance between the installation position of the lighting device and the designated position in the image of the installed area,
calculates a difference between an installation height of the lighting device and a height of the designated position, and
calculates, based on the distance and the difference, a gravity direction component of the at least one designated illumination direction.

25. The lighting control device according to claim 23, wherein
the processing unit
calculates a distance between the installation position of the lighting device and the designated position in the image of the installed area,
calculates a difference between an installation height of the lighting device and a height of the designated position, and
calculates, based on the distance and the difference, a gravity direction component of the at least one designated illumination direction.

26. The lighting control device according to claim 1, wherein
the processing unit
acquires an omnidirectional image from an omnidirectional image capturing device that captures the omnidirectional image including the at least one illumination direction in which the lighting device illuminates,
acquires, as the direction designation information, information for designating a position in the omnidirectional image, and
calculates, as the at least one designated illumination direction, a direction from the installation position of the lighting device toward a designated position that is the position designated in the omnidirectional image.

27. The lighting control device according to claim 26, wherein the processing unit associates a reference direction for image capturing by the omnidirectional image capturing device and a reference direction for illumination by the lighting device.

28. The lighting control device according to claim 26, wherein
the processing unit
acquires operation information on a pinch operation on the omnidirectional image, and
controls a size of at least one range of the at least one illumination direction based on the operation information.

29. The lighting control device according to claim 1, wherein
the at least one designated illumination direction is a plurality of designated illumination directions, and
the at least one range of the at least one illumination direction including the at least one designated illumination direction is a plurality of ranges.

30. A lighting control system comprising:
a lighting device using a plurality of light sources; and
a lighting control device that controls illumination of the lighting device,
wherein the lighting control device
acquires direction designation information for designating an illumination direction to which the lighting device illuminates,
acquires light source information indicating a plurality of light source irradiation directions that are irradiation directions of the plurality of light sources, and
based on (i) a designated illumination direction that is the illumination direction designated by the direction designation information and (ii) the plurality of light source irradiation directions, causes part of the plurality of light sources to illuminate.

31. A lighting control method that controls illumination by a lighting device using a plurality of light sources, the lighting control method comprising:
acquiring direction designation information for designating an illumination direction to which the lighting device illuminates;
acquiring light source information indicating a plurality of light source irradiation directions that are irradiation directions of the plurality of light sources; and
based on (i) a designated illumination direction that is the illumination direction designated by the direction designation information and (ii) the plurality of light source irradiation directions, causing part of the plurality of light sources to illuminate.

* * * * *